(12) United States Patent
Tanaka

(10) Patent No.: US 7,570,255 B2
(45) Date of Patent: Aug. 4, 2009

(54) DISPLAY DEVICE AND DISPLAY METHOD

(75) Inventor: Shogo Tanaka, Hyogo (JP)

(73) Assignee: Fujitsu Ten Limited, Kobe-shi, Hyogo (JP)

( * ) Notice: Subject to any disclaimer, the term of this patent is extended or adjusted under 35 U.S.C. 154(b) by 563 days.

(21) Appl. No.: 11/299,657

(22) Filed: Dec. 13, 2005

(65) Prior Publication Data

US 2006/0139234 A1 Jun. 29, 2006

(30) Foreign Application Priority Data

Dec. 13, 2004 (JP) ............ P2004-359620
Sep. 1, 2005 (JP) ............ P2005-253879

(51) Int. Cl.
G06F 3/038 (2006.01)
G06F 15/00 (2006.01)
G09G 5/00 (2006.01)
G06T 1/00 (2006.01)

(52) U.S. Cl. .................... 345/204; 345/501
(58) Field of Classification Search .......... 345/698, 345/660
See application file for complete search history.

(56) References Cited

U.S. PATENT DOCUMENTS

| 5,828,415 | A | * | 10/1998 | Keating et al. | ............ 348/458 |
| 5,936,596 | A | | 8/1999 | Yoshida et al. | |
| 6,046,849 | A | | 4/2000 | Moseley et al. | |
| 6,055,013 | A | | 4/2000 | Woodgate et al. | |
| 6,055,103 | A | | 4/2000 | Woodgate et al. | |
| 6,377,295 | B1 | | 4/2002 | Woodgate et al. | |
| 6,437,915 | B2 | | 8/2002 | Moseley et al. | |
| 6,545,655 | B1 | * | 4/2003 | Fujikawa | ............ 345/87 |
| 6,624,863 | B1 | | 9/2003 | Jacobs et al. | |
| 6,954,185 | B2 | | 10/2005 | Ogino | |
| 7,030,944 | B2 | | 4/2006 | Fujimoto | |
| 7,167,222 | B2 | | 1/2007 | Inoue et al. | |
| 2004/0119896 | A1 | | 6/2004 | Kean et al. | |

(Continued)

FOREIGN PATENT DOCUMENTS

EP 0 829 744 A2 3/1998

(Continued)

OTHER PUBLICATIONS

S. Tanaka et al., "Display Apparatus," U.S. Appl. No. 11/520,748, filed Sep. 14, 2006.

(Continued)

Primary Examiner—Kee M Tung
Assistant Examiner—Jacinta Crawford
(74) Attorney, Agent, or Firm—Oliff & Berridge, PLC

(57) ABSTRACT

A display device includes a display section and a video signal generating section. The display section displays n video pictures in n viewing directions on one and the same screen on a basis of a video signal where n indicates natural number. First particular number of pixels are arranged in a first direction in the display section. The video signal generating section arranges pixels of each of n video source signals at predetermined intervals in a first direction to generate the video signal. Each of the n video source signal indicates a video picture in which second particular number of pixels are arranged in the first direction. The second particular number is less than the first particular number.

17 Claims, 25 Drawing Sheets

U.S. PATENT DOCUMENTS

2005/0052529 A1    3/2005    Mashitani et al.

FOREIGN PATENT DOCUMENTS

| | | | |
|---|---|---|---|
| GB | 2 405 545 A | | 3/2005 |
| GB | 2 405 546 A | * | 3/2005 |
| JP | A 06-186526 | | 7/1994 |
| JP | A-6-236152 | | 8/1994 |
| JP | A-7-103778 | | 4/1995 |
| JP | A 09-046622 | | 2/1997 |
| JP | A-10-123461 | | 5/1998 |
| JP | A-10-130537 | | 5/1998 |
| JP | A-11-52105 | | 2/1999 |
| JP | A-11-52372 | | 2/1999 |
| JP | A-11-84131 | | 3/1999 |
| JP | A-11-95167 | | 4/1999 |
| JP | A-11-248466 | | 9/1999 |
| JP | A 11-331876 | | 11/1999 |
| JP | A-2000-36927 | | 2/2000 |
| JP | A-2000-47195 | | 2/2000 |
| JP | A 2000-137443 | | 5/2000 |
| JP | A-2000-162979 | | 6/2000 |
| JP | A-2000-180834 | | 6/2000 |
| JP | A-2001-283926 | | 10/2001 |
| JP | A-2001-311944 | | 11/2001 |
| JP | A-2002-234399 | | 8/2002 |
| JP | A-2003-121847 | | 4/2003 |
| JP | A-2003-137005 | | 5/2003 |
| JP | A 2003-196682 | | 7/2003 |
| JP | A-2003-197018 | | 7/2003 |
| JP | A-2003-337326 | | 11/2003 |
| JP | A-2004-79488 | | 3/2004 |
| JP | B2-3503925 | | 3/2004 |
| JP | A-2004-233816 | | 8/2004 |
| JP | A-2005-71286 | | 3/2005 |
| JP | A-2005-73076 | | 3/2005 |
| JP | A-2005-78080 | | 3/2005 |
| JP | A-2005-86773 | | 3/2005 |
| JP | A-2005-284592 | | 10/2005 |
| JP | A-2005-313782 | | 11/2005 |
| JP | A-2006-64733 | | 3/2006 |
| JP | A-2006-131227 | | 5/2006 |
| JP | A-2006-151363 | | 6/2006 |
| JP | A-2006-151364 | | 6/2006 |
| WO | WO 97/42540 | | 11/1997 |
| WO | WO 2004/011987 A1 | | 2/2004 |
| WO | WO 2004/016460 A1 | | 2/2004 |

OTHER PUBLICATIONS

S. Tanaka et al., "Display Apparatus and In—Vehicle Display Apparatus," U.S. Appl. No. 11/712,517, filed Mar. 1, 2007.

S. Tanaka et al., "Display Apparatus," U.S. Appl. No. 11/520,743, filed Sep. 14, 2006.

S. Tanaka, "Display Apparatus," U.S. Appl. No. 11/520,670, filed Sep. 14, 2006.

S. Tanaka et al., "In-Vehicle Display Apparatus and Display Control Method Therefor," U.S. Appl. No. 11/583,076 filed Oct. 19, 2006.

S. Tanaka, "Liquid Crystal Display Apparatus," U.S. Appl. No. 11/488,064, filed July 18, 2006.

M. Maehata et al., "Receiver," U.S. Appl. No. 11/475,216, filed Jun. 27, 2006.

Fujitsu Ten Technical Report, Fall 2005 Dual AVN Development, Dec. 2005, vol. 23, No. 2.

Fujitsu Ten Limited Journal, Fall 2005 Dual AVN Development, Jan. 2006, No. 26.

* cited by examiner

FIG. 19A

| R | G | B | R |
|---|---|---|---|
| G | B | R | G |
| B | R | G | B |
| R | G | B | R |

FIG. 19B

DISPLAY DEVICE AND DISPLAY METHOD

This application is based upon and claims the benefit of priority from Japanese Patent Application No. 2004-359620 filed on Dec. 13, 2004 and Japanese Patent Application No. 2005-253879 filed on Sep. 1, 2005; the entire contents of which are incorporated herein by reference.

BACKGROUND OF THE INVENTION

1. Field of the Invention

The present invention relates to a display device including a display section, which displays a plurality of individual video pictures in a plurality of viewing directions on one and the same screen based on a video signal generated from a plurality of video source signals.

2. Description of the Related Art

The development of existing main display devices has been optimized so that a viewer can see images with high quality in any directions or a plurality of viewers can simultaneously obtain the same information. However, there are many applications, which require individual viewers to obtain different information from the same display device. For example, a driver wants to see satellite navigation data while a passenger wants to see video pictures of a DVD or a television tuner in a car. In this example, if two display devices are required to satisfy the both needs, a problem such as high cost or a need for space arises.

To overcome this problem, JP Hei. 6-186526 A and JP 2000-137443 A have proposed a display device, which can simultaneously display two different screens on a single liquid crystal display. For example, this display device enables a driver and a passenger to see the different screens, respectively. In addition, JP Hei. 11-331876 and JP Hei. 9-46622 A have proposed a two-screen display device, which can simultaneously display two kinds of vide pictures on one and the same screen.

SUMMARY OF THE INVENTION

Under these circumstances, the invention has been made. The invention provides a display device, which can easily obtain a video signal with high quality without executing a complicated process with respect to a video source signal.

According to a first aspect of the invention, a display device includes a display section and a video signal generating section. The display section displays n video pictures in n viewing directions on one and the same screen on a basis of a video signal where n indicates natural number. First particular number of pixels are arranged in a first direction in the display section. The video signal generating section arranges pixels of each of n video source signals at predetermined intervals in a first direction to generate the video signal. Each of the n video source signal indicates a video picture in which second particular number of pixels are arranged in the first direction. The second particular number is less than the first particular number.

When a video signal is generated from a video source signal for a plurality of viewing directions, it is necessary to arrange the pixels of each video source signal in the first direction so that the pixels of each video source signal in the first direction are allotted at the predetermined intervals to the display pixels of the display sections arranged in the first direction. However, according to the configuration described above, since the second particular number (the number of the pixels of each video source signal in the first direction) is less than the first particular number (the number of the pixels of the screen in the first direction), it is not necessary to execute compression processing such as throwing out pixels of each video source signal along the first direction in the case of generating the video signal. Accordingly, the video picture, which displayed based on such a video signal, has an enough high quality. Furthermore, no hardware part for executing the compression processing is required, which contributes to cost reduction.

According to a second aspect of the invention, the second particular number may be equal to or less than one nth of the first particular number where n denotes natural number greater than 1.

According to this configuration, if the second particular number (the number of the pixels of each video source signal in the first direction) is equal to or less than one nth of the first particular number (the number of the pixels of the screen in the first direction), the video signal can be generated from at least n types of the video source signals without deteriorating the quality of the video picture. Also, it is possible for one and the same screen of the display section to display individual video pictures in the n viewing directions.

According to a third aspect of the invention, a display device includes a display section and a video signal generation section. The display section displays n video pictures in n viewing directions on one and the same screen on a basis of a video signal. Particular number of pixels are arranged in a first direction in the display section. When number of the pixels of each of the n video source signals in the first direction is equal to or less than one nth of the particular number where n denotes natural number greater than 1, the video signal generation section arranges pixels of each of the n video source signals at predetermined intervals in the first direction to generate the video signal. When the number of the pixels of each of the n video source signals in the first direction is greater than one nth of the particular number, the video signal generation section: compresses each of the n video source signals into a modified video source signal; and arranges the pixels of the modified video source signal at predetermined intervals in the first direction to generate the video signal. Number of pixels of the modified video source signal in the first direction is equal to or less than one nth of the particular number.

According to this configuration, a video signal can be properly generated from any video source signal having any number of pixels along the first direction. That is, if the number of pixels along the first direction is less than the number of display pixels, a video signal is generated without executing compression processing, so as to obtain a high quality image. On the other hand, if the number of pixels along the first direction is greater than the number of display pixels, a proper image signal is generated by executing proper compression processing even though quality of the image signal becomes more or less deteriorated.

According to a fourth aspect of the invention, the video signal generating section may arrange the pixels of the n video source signals in the first direction in predetermined order alternately so as to correspond to arrangement of three primary color components of the pixels of the screen, which correspond to three primary color components of the pixels of the n video source signals.

Each pixel of the screen is made of red, green and blue sub-pixels. Also, pixel data of each video source signal includes red, green and blue color component data. When the video signal is generated by arranging pixels of the plurality of video source signals, if arrangement of the sub-pixels of the display pixel does not match with arrangement of component data of the video source signal, it is likely that an image displayed based on such a video signal has no color reproducibility. Accordingly, the color reproducibility can be secured by arranging the pixels of the n video source signals in the first direction in predetermined order alternately so as to correspond to arrangement of three primary color components of the pixels of the screen, which correspond to three primary color components of the pixels of the n video source signals.

According to a fifth aspect of the invention, third particular number of pixels are arranged in a second direction, which intersects the first direction, in the display section. Each of the n video source signals indicates the video picture in which fourth particular number of pixels are arranged in the second direction. The fourth particular number is less than the third particular number. The video signal generating section arranges the pixels of each of the n video source signals at predetermined intervals in the second direction. The video signal generating section fills an interpolation pixel between the arranged pixels of each of the n video source signals.

Since the pixels of each video source signal in the first direction are arranged and distributed at the predetermined intervals in the first direction of the display pixels, if the video source signals are arranged along the second direction crossing the first direction to generate a vide signal, an image displayed based on such a video signal is different from the video source signals in a ratio of the first direction to the second direction (for example, an aspect ration of a video picture when the first direction is a horizontal direction and the second direction is a vertical direction), which may bring discomfort with regard to the displayed video picture. According to the above configuration, since the pixels of each video source signal are arranged and distributed in the second direction and interpolation pixels are filled between the arranged pixels, a ratio of the first direction to the second direction of the video picture, which is displayed based on the video signal, can be made equal to that of each video source signal, which contributes to eliminate discomfort with regard to the video picture.

According to a sixth aspect of the invention, the video signal generating section may generate the interpolation pixel on a basis of each of the n video source signals. An image generated based on the video signal having the interpolation pixels filled becomes a natural image close to original video source signals.

According to a seventh aspect of the invention, third particular number of pixels are arranged in a second direction, which intersects the first direction, in the display section. Each of the n video source signals indicates the video picture in which fourth particular number of pixels are arranged in the second direction. The third particular number is equal to the fourth particular number.

According to an eighth aspect of the invention, a display device includes a screen and a viewing direction control section. A video signal generated from n types of video source signals is input to the viewing direction control section, where n denotes natural number. Numbers of pixels of the video source signals in a first direction is equal to each other. The viewing direction control section displays the different n video pictures in the n viewing directions simultaneously. Number of pixels of the video signal in the first direction is n times the number of the pixels of each of the n types of the video source signals in the first direction. Number of pixels of the screen in the first direction is equal to or greater than that of the video signal in the first direction.

According to this configuration, the video signal can be expanded in the first direction n times a certain video source signal with using the n types of the video source signals. That is, it is not necessary to execute processing of throwing out predetermined data from the video source signals, and accordingly, it is possible to easily generate the video signal such that the video signal corresponds to the number of the pixels of the screen in the first direction. In addition, since the video signal has pixels corresponding to all video source signals, it is possible to provide a multi-view display device for displaying an image having high display quality.

According to a ninth aspect of the invention, in the video signal, the pixel data of the n types of the video source signals may be arranged in the first direction in predetermined order alternately so that three primary color components of each pixel data correspond to arrangement of three primary color components of a corresponding pixel of the screen.

According to this configuration, since the video signal is generated from the video source signals, which are expanded in the first direction such that the three primary color components of pixel data constituting the n types of the video source signals correspond to the three primary color components of the pixels of the screen, it is possible to provide a multi-view display device for displaying an image having high display quality.

According to a tenth aspect of the invention, number of the pixels of the video signal in a second direction intersecting the first direction may be n times number of the pixels of each video source signal in the second direction. Number of the pixels of the screen in the second direction may be equal to or greater than the number of the video signal in the second direction.

According to this configuration, since the video picture, which has been expanded in the first direction, is expanded in the second direction by an expansion ratio of the first direction, it is possible to display an image having a constant aspect ratio regardless of number of the types of video source signals.

According to an eleventh aspect of the invention, the display device may further include a video signal generating section that generates part of pixel data of the video signal on a basis of the pixel data of the video source signal.

According to this configuration, it is possible to supplement lack of pixel data, which occur due to expansion of the video picture in the second direction. Also, it is possible to provide a multi-view display device for displaying an image having higher display quality.

According to a twelfth aspect of the invention, the vide signal generating section may interpolate new pixel data between two pieces of pixel data of each video source signal adjacent to each other in the second direction.

According to this configuration, since new pixel data are interpolated without unevenness, it is possible to provide a multi-view display device for displaying an image without any spots.

According to a thirteenth aspect of the invention, at least one of the video source signals may be map data output from a navigation device.

According to a fourteenth aspect of the invention, a display method includes arranging pixels of each of n video source signals at predetermined intervals in a first direction to generate a video signal where n indicates natural number; and displaying n video pictures in n viewing directions on one and the same screen on a basis of a video signal. First particular number of pixels are arranged in a first direction in the screen. Each of the n video source signal indicates a video picture in which second particular number of pixels are arranged in the first direction. The second particular number is less than the first particular number.

According to a fifteenth aspect of the invention, the second particular number may be equal to or less than one nth of the first particular number where n denotes natural number greater than 1.

According to a sixteenth aspect of the invention, a display method includes compressing each of n video source signals, which indicates a video picture in which second particular number of pixels are arranged in a first direction, into a modified video source signal, which indicates a modified video picture in which third particular number of pixels are arranged in the first direction; arranging the pixels of each of the n modified video source signals at predetermined intervals in the first direction to generate a video signal; and displaying the n video pictures in n viewing directions on one and the same screen on a basis of the video signal. First particular number of pixels are arranged in a first direction in the screen. The second particular number is greater than the first particular number. The third particular number is less than the first particular number.

According to a seventeenth aspect of the invention, the arranging nay arrange the pixels of the n video source signals in the first direction in predetermined order alternately so as to correspond to arrangement of three primary color components of the pixels of the screen, which correspond to three primary color components of the pixels of the n video source signals.

According to an eighteenth aspect of the invention, third particular number of pixels may be arranged in a second direction, which intersects the first direction, in the screen. Each of the n video source signal may indicate the video picture in which fourth particular number of pixels are arranged in the second direction. The fourth particular number may be less than the third particular number. The arranging may include arranging the pixels of each of the n video source signals at predetermined intervals in the first direction; and filling an interpolation pixel between the arranged pixels of each of the n video source signals.

According to a nineteenth aspect of the invention, the arranging may further include generating the interpolation pixel on a basis of the video source signals.

As described above, according to the configuration described above, it is possible to provide a display device, which can easily obtain a video signal with high quality without executing complicated processing with respect to video source signals.

BRIEF DESCRIPTION OF THE DRAWINGS

FIG. 19 is an explanatory diagram of R, G, and B component arrangement.

DETAILED DESCRIPTION OF EMBODIMENTS OF THE INVENTION

Hereinafter, display devices according to embodiments of the invention will be described with reference to the accompanying drawings. It is to be understood that scope of the invention is not limited to the following embodiments but covers inventions as set forth in claims and their equivalents.

Figure 1:
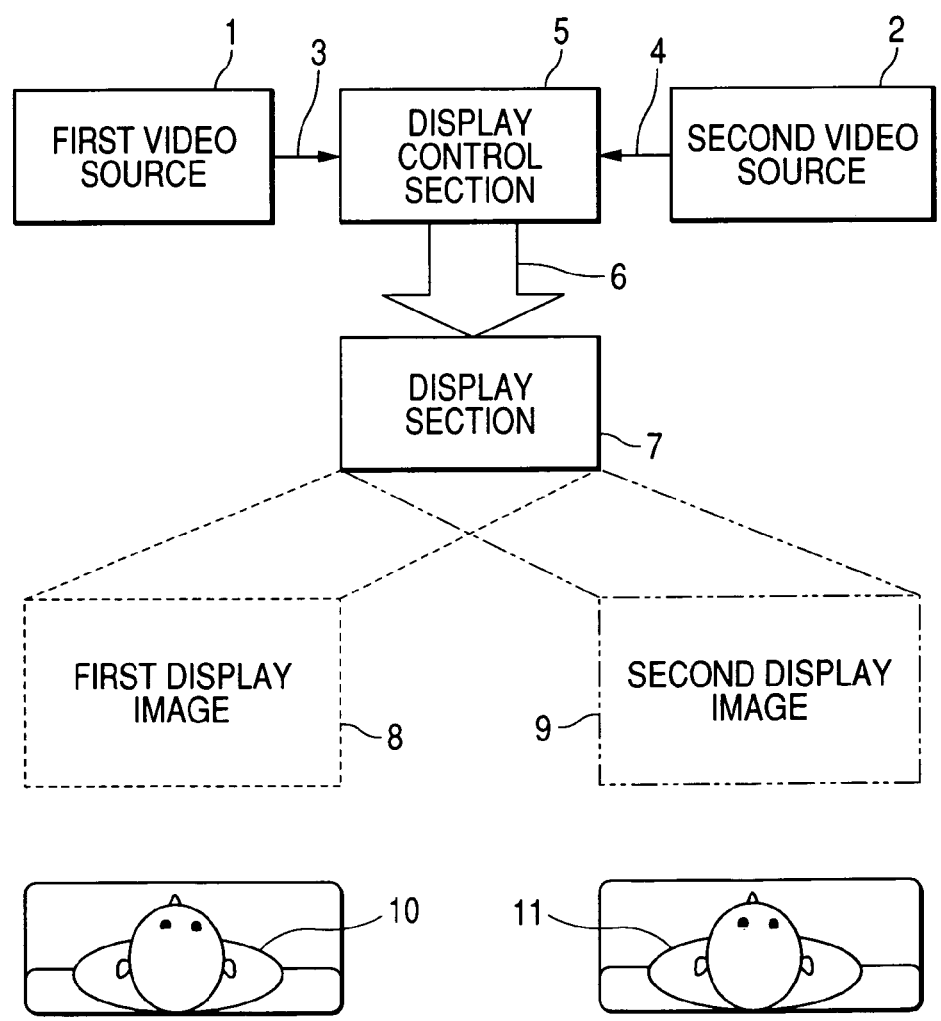
FIG. 1 is a conceptual diagram of a display device according to one embodiment of the invention.

FIG. 1 is a conceptual diagram of a multi-view display device (hereinafter, abbreviated as "display device") according to one embodiment of the invention. In the figure, reference numeral 1 denotes a first video source, reference numeral 2 denotes a second video source, reference numeral 3 denotes first video data from the first video source 1, reference numeral 4 denotes second video data from the second video source 2, reference numeral 5 denotes a display control section, reference numeral 6 denotes display data, reference numeral 7 denotes a display section (for example, a liquid crystal panel or the like), reference numeral 8 denotes a first display image based on the first video source 1, reference numeral 9 denotes a second display image based on the second video source 2, reference numeral 10 denotes a viewer (user) located on the left side of the display section 7, and reference numeral 11 denotes a viewer (user) located on the right side of the display section 7.

The conceptual diagram of FIG. 1 conceptually shows that the viewer 10 and the viewer 11 can substantially simultaneously see the first display image 8 and the second display image 9, respectively, according to relative positions of the viewers 10 and 11 to the display section 7, that is, according to a viewing angle for the display section 7, while seeing the first display image 8 and the second display image 9 over the entire display plane of the display section 7. In FIG. 1, the first video source 1 may be a movie of a DVD player or a video picture received by television receiver, for example. Also, the second video source 2 may be a map or root guidance image of a car navigator, for example. The first video data 3 and the second video data 4 are supplied to the display control section 5 and the display control section 5 processes the first video data 3 and the second video data 4 so that the first video data 3 and the second video data 4 can be displayed substantially simultaneously on the display section 7.

The display section 7 to which the display data 6 is supplied from the display control section 5 includes a liquid crystal panel equipped with a parallax barrier, which will be described later. Half of the entire pixels in a horizontal direction of the display section 7 are used for display of the first display image 8 based on the first video source 1, and the remaining half of the entire pixels are used for display of the second display image 9 based on the second video source 2. The viewer 10 located on the left side of the display section 7 sees only pixels corresponding to the first display image 8. The parallax barrier formed on a surface of the display section 7 interrupts the second display image 9 so that the viewer 10 does not see the second display image 9. On the other hand, the viewer 11 located on the right side of the display section 7 sees only pixels corresponding to the second display image 9. The parallax barrier interrupts the first display image 8 so that the viewer 11 does not see the first display image 8. Examples of the parallax barrier are disclosed in U.S. Pat. Nos. 6,046,849; 6,055,013; 6,055,103; 6,377,295; 6,437,915 and 6,624,863, entire contents of which are incorporated herein by reference.

According to the above-described configuration, different information and contents displayed on a signal screen can be provided to left and right users, respectively. Of course, if the first and second video sources 1, 2 are the same, the left and right users can see the same image.

Figure 2:
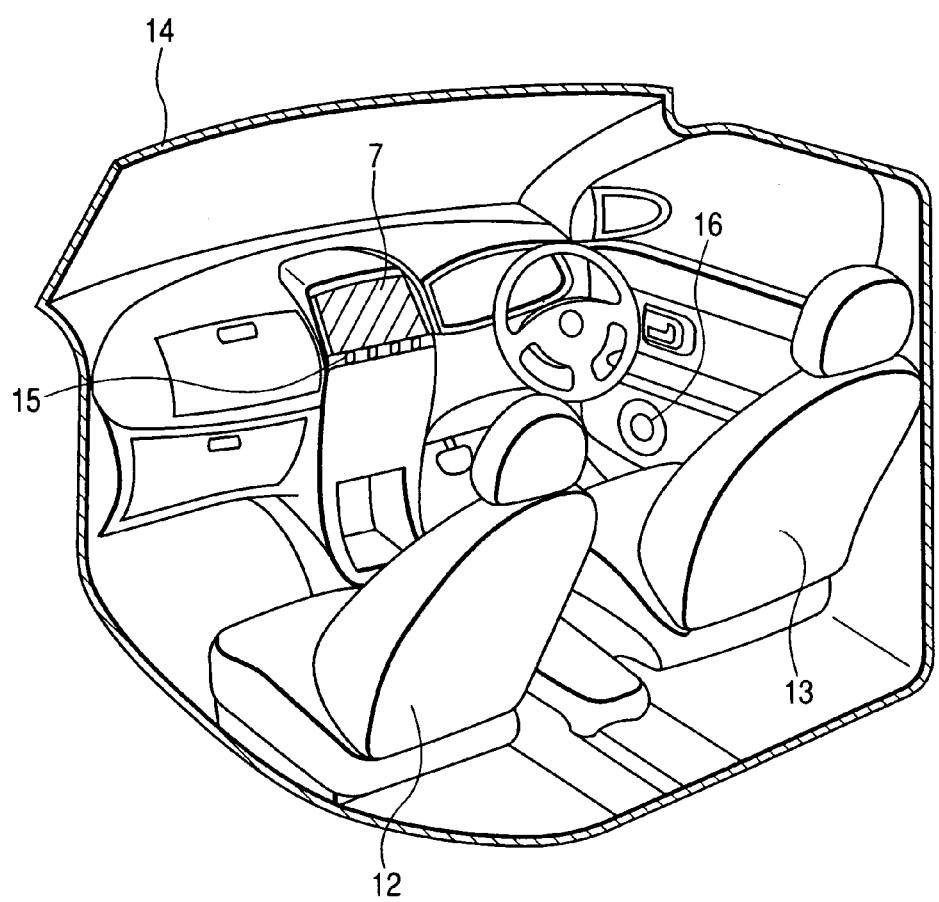
FIG. 2 is a perspective view illustrating an example where the display device is mounted on a vehicle.

FIG. 2 is a perspective view illustrating an example in which the display device according to one embodiment of the invention is mounted on a vehicle. In the figure, reference numeral 12 denotes a passenger's seat, reference numeral 13 denotes a driver's seat, reference numeral 14 denotes a window shield, reference numeral 15 denotes an operation unit, and reference numeral 16 denotes a speaker.

The display section 7 of the display device shown in FIG. 1 is arranged on a dashboard disposed substantially in the middle between the driver's seat 13 and the passenger's seat 12, for example, as shown in FIG. 2. A user operates the display device through a touch panel (not shown) formed integrally on the surface of the display section 7, the operation unit 15, and/or an infrared or radio remote controller (not shown). The speaker 16, which is arranged in each door of the vehicle, outputs voice or warning beeps in association with the display image.

The viewer 11 and viewer 10 shown in FIG. 1 sit on the driver's seat 13 and the passenger's seat 12, respectively. An image, which can be seen in a first viewing direction (driver's seat side) of the display section 7, may be a car navigation map. Also, an image, which can be seen substantially simultaneously in a second viewing direction (passenger's seat side) may be a television image or a DVD movie image, for example. Accordingly, the car navigation device assists a driver sitting in the driving seat 13 while a passenger sitting in the passenger's seat 12 may enjoy a television or a DVD. In addition, each image is displayed over an entire 7-inch screen, for example. Therefore, a screen size does not become small unlike a conventional multi-window display. In other words, optimal information and contents are provided to the driver and the passenger as if independent displays were provided for the driver and the passenger.

Figure 3:
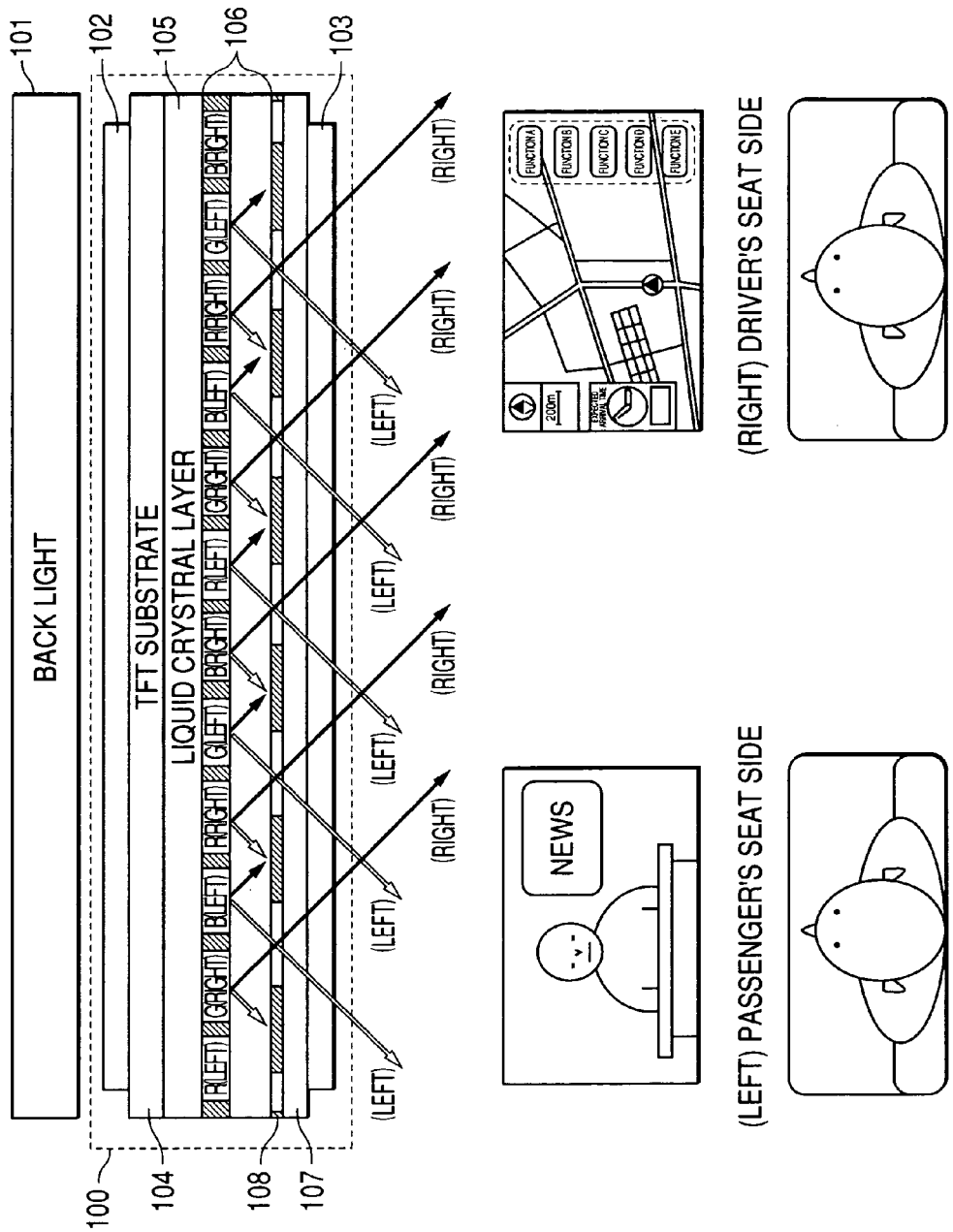
FIG. 3 is a schematic view of a section structure of a display section.

FIG. 3 is a schematic view of a section structure of the display section 7. In the figure, reference numeral 100 denotes a liquid crystal panel, reference numeral 101 denotes a backlight, reference numeral 102 denotes a polarizing plate provided on the backlight side of the liquid crystal panel, reference numeral 103 denotes a polarizing plate arranged in the front surface in a light emitting direction of the liquid crystal panel, reference numeral 104 denotes a TFT (thin film transistor), reference numeral 105 denotes a liquid crystal layer, reference numeral 106 denotes a color filter substrate, reference numeral 107 denotes a glass substrate, and reference numeral 108 denotes parallax barriers. The liquid crystal panel 100 is configured so that the liquid crystal layer 105 is sandwiched between the TFT substrate 104 and the color filter substrate 106 opposite to the TFT substrate 104, and the two substrates 104 and 106, the parallax barriers 108 and the glass substrate 107, which are arranged on the front side in the light emitting direction, are sandwiched between the two polarizing plates 102 and 103. The liquid crystal panel 100 is spaced apart from the backlight 101. The liquid crystal panel 100 has pixels, each of which has R, G, and B colors (three primary colors).

The pixels of the liquid crystal panel 100 are divided into pixels for the left side (passenger's seat side) display and pixels for the right side (driver's seat side) display and controlled for display. The parallax barriers 108 interrupts displaying provided by the pixels for the left side (passenger's seat side) display so that the displaying provided by the pixels for the left side display cannot be seen from the right side (driver's seat side) but can be seen from the left side (passenger's seat side). On the other hand, the parallax barrier 108 interrupts displaying provided by the pixels for the right side (driver's seat side) display so that the displaying provided by the pixels for the right side display cannot be seen from the left side (passenger's seat side) but can be seen from the right side (driver's seat side) Thus, it is possible to provide different displays to the driver and the passenger. For example, the driver can be provided with map information of the car navigation device, and simultaneously, the passenger can see movies from a DVD. In addition, if the configuration of the parallax barriers 108 and each pixel of the liquid crystal panel are changed, it is possible to display different images in a plurality of directions, for example, three directions. Also, the parallax barriers may be composed of liquid crystal shutters or the like, which can be electrically driven, so that the viewing angle can vary.

Figure 4:
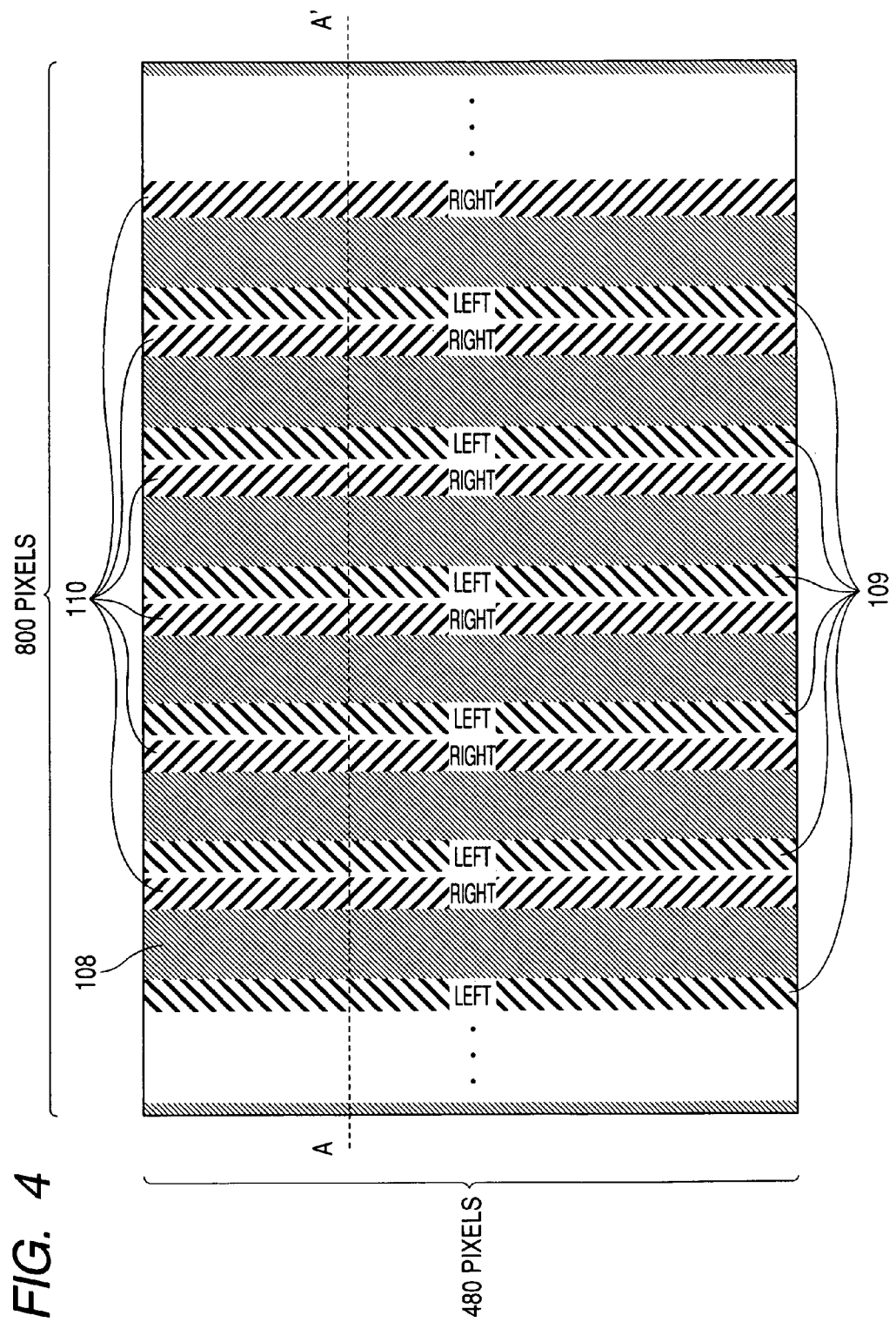
FIG. 4 is a schematic front view of a structure of a display panel.

FIG. 4 is a schematic front view of a structure of a display panel. FIG. 3 is a section view taken along line A-A' in FIG. 4. In FIG. 4, reference numeral 109 denotes pixels for the left side (passenger's seat side) display and reference numeral 110 denotes pixels for the right side (driver's seat side) display. FIGS. 3 and 4 show part of the liquid crystal panel 100 in which 800 pixels are arranged in the horizontal direction and 480 pixels are arranged in the vertical direction, for example. The pixels 109 for the left side (passenger's seat side) display and the pixels 110 for the right side (driver's seat side) display are grouped in the vertical direction and are alternately arranged in the horizontal direction. The parallax barriers 108 are arranged at predetermined intervals in the horizontal direction and are uniform in the vertical direction. According to this configuration, when a user sees the display panel from the left side, the parallax barriers 108 cover the pixels 110 for the right side display and the user can see the pixels 109 for the left side display. Likewise, when the user sees the display panel from the right side, the parallax barriers 108 cover the pixels 109 for the left side display and the user can see the pixels 110 for the right side display. Since both of the pixels 109 for the left side display and the pixels 110 for the right side display are seen from near the front surface, an image displayed by the pixels 109 for the left side display and an image displayed by the pixels 110 for the right side display are seen with substantially overlapping. Here, the pixels 109 for the left side display and the pixels 110 for the right side display, which are alternately arranged in FIG. 4, have R, G, and B colors as shown in FIG. 3. Each group of the pixels 109 and 110 may be configured of monochrome column such as an R column, a G column or a B column, in the vertical direction. Alternatively, each group of the pixels 109 and 110 may be configured in the vertical direction so that each column is composed of a plurality pixels having R, G, and B colors.

Figure 10:
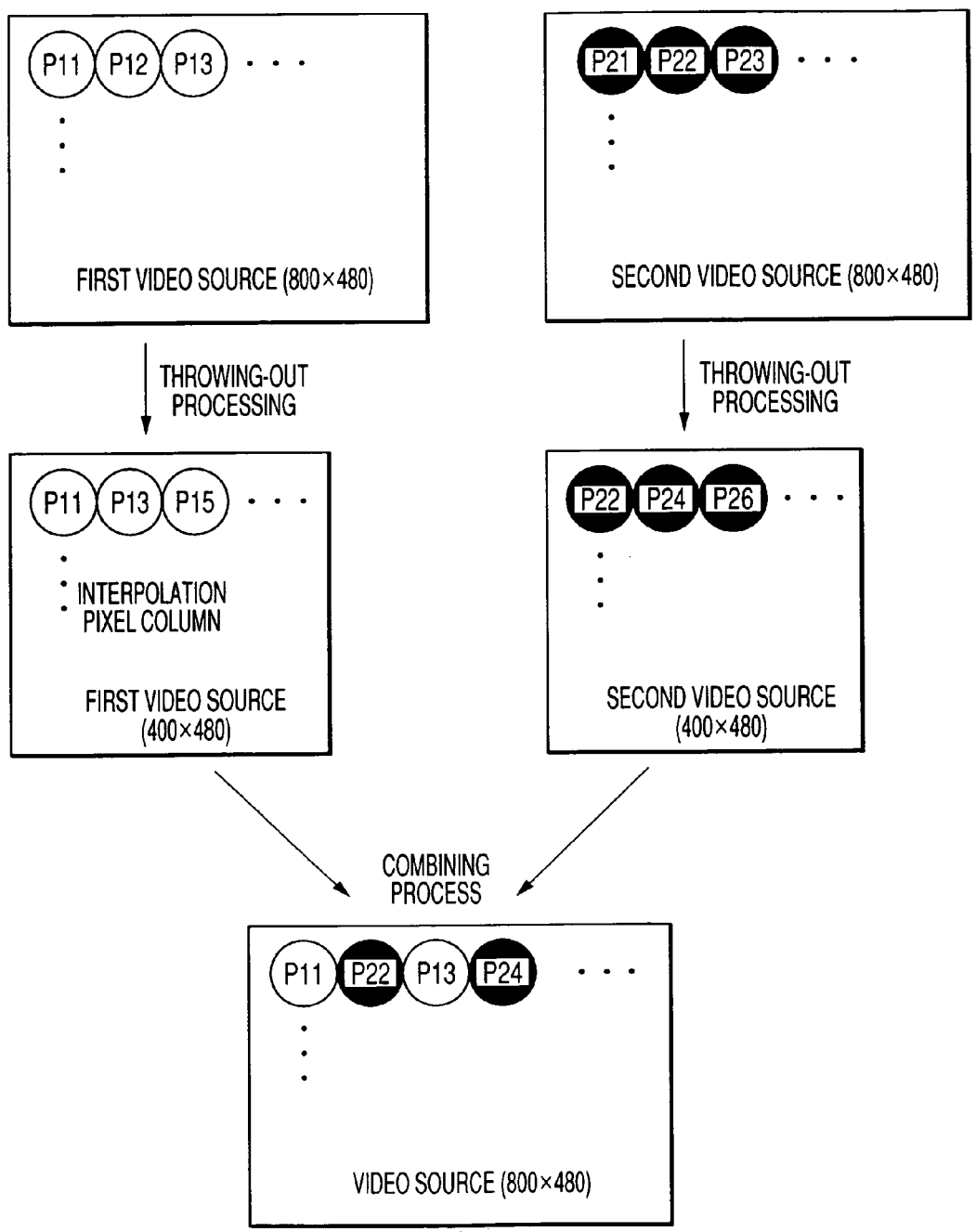
FIG. 10 is an explanatory diagram illustrating a generation order of a video signal displayed on the display section from two lines of video signals.

Specifically, in order to make the display section 7 display different images for the right side (driver's seat side) and the left side (passenger side) in two viewing directions, for example, 800×480 pixels of each video source signal corresponding to each image may be horizontally compressed into 400×480 pixels and then, the compressed video source signals are combined to generate a video signal corresponding to the number of pixels (800×480) of the display section 7. In this case, as shown in FIG. 10, source signals of odd number columns may be thrown out from the original source signals for the driver's seat side. Also, source signals of even number columns may be thrown out from the original source signals for the passenger's seat side. It is noted that throwing-out processing is not limited to this example. For example, odd number columns or even number columns may be thrown out in the unit of each elements of R, G, and B colors constituting one pixel. Specifically, as shown in FIG. 10, it is assumed that pixel data of the first video source signal 3 in the uppermost row are designated as P11, P12, P13, . . . and that pixel data of the second video source signal 4 in the uppermost row are designated as P21, P22, P23, . . . . The display control section 5 may throw out the even number column of the pixel data of the first video source signal 3, that is, throw out P12, P14, P16, . . . , and also may throw out odd number column of the pixel data of the second video source signal 4, that is, throw out P21, P23, P25, . . . . By executing this throwing-out processing, the first and second video source signals 3, 4 of 800×480 pixels are compressed into compressed first and second video source signals of 400×480 pixels. The display control section 5 arranges the pixel data of the compressed first and second video source signals in order of P11, P22, P13, P24, . . . , P1x, P2y, . . . (x=2n−1, y=2n and n is natural number) from left to right. The throwing-out processing and the combining processing (rearranging processing) are similarly applied to pixel data of the first and second video source signals 3, 4 in rows other than the uppermost row. Accordingly, the display control section 5 generates and outputs the video signal to the display section 7.

Figure 22:
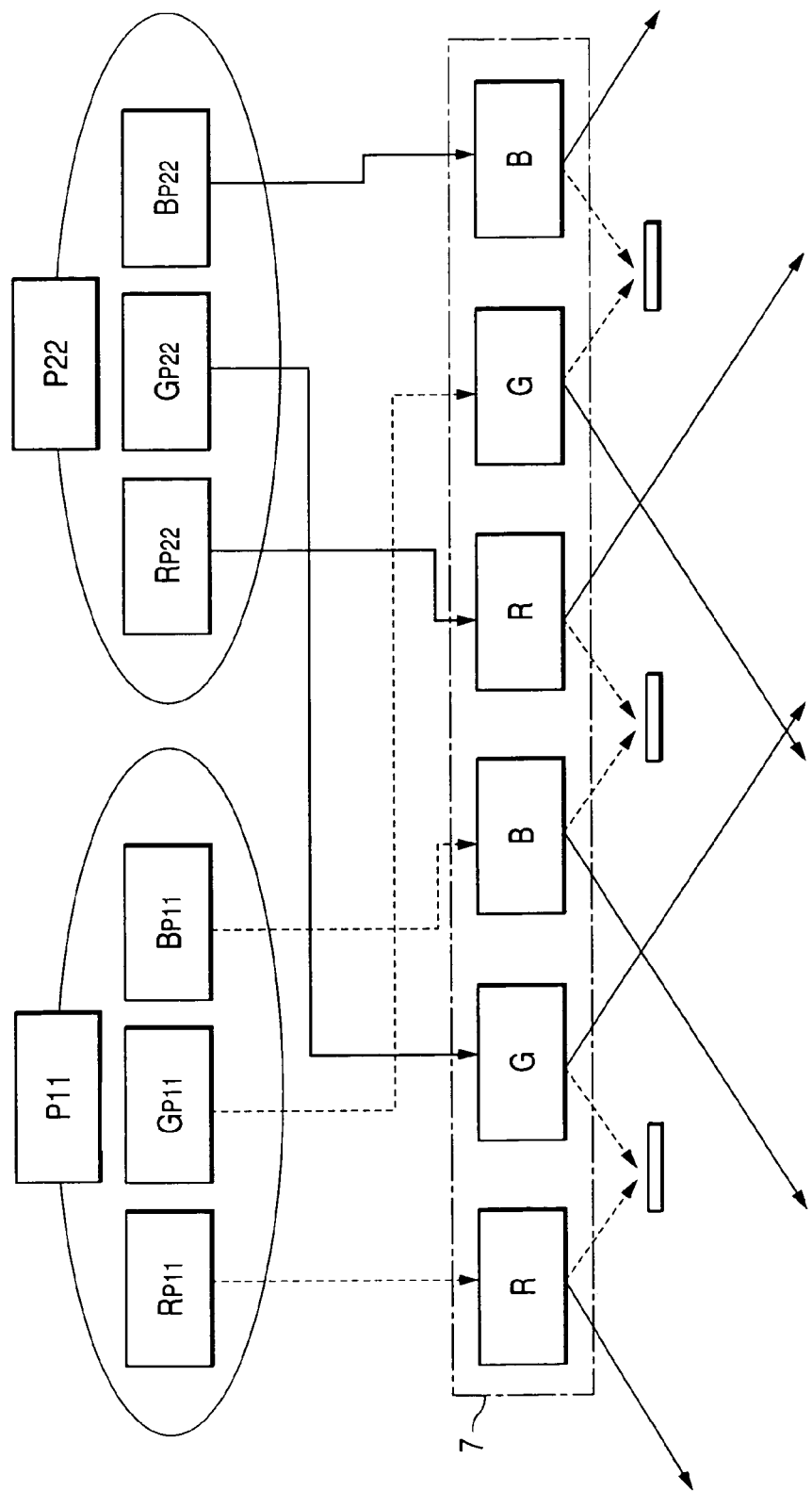
FIG. 22 shows an explanatory diagram of R, G, and B component arrangement.

The video signal generated by the processing shown in FIG. 10 is allotted to sub-pixels (i.e., R. G and B pixels) of the display section 7 as shown in FIG. 22. That is, R data ($R_{P11}$ and $R_{P22}$) are allotted to R sub-pixels of the display section 7, G data ($G_{P11}$ and $G_{P22}$) are allotted to G sub-pixels of the display section 7, and B data ($B_{P11}$ and $B_{P22}$) are allotted to B sub-pixels of the display section 7. Thereby, two difference video pictures can be seen from the driver's seat and the passenger's seat, respectively.

Figure 21:
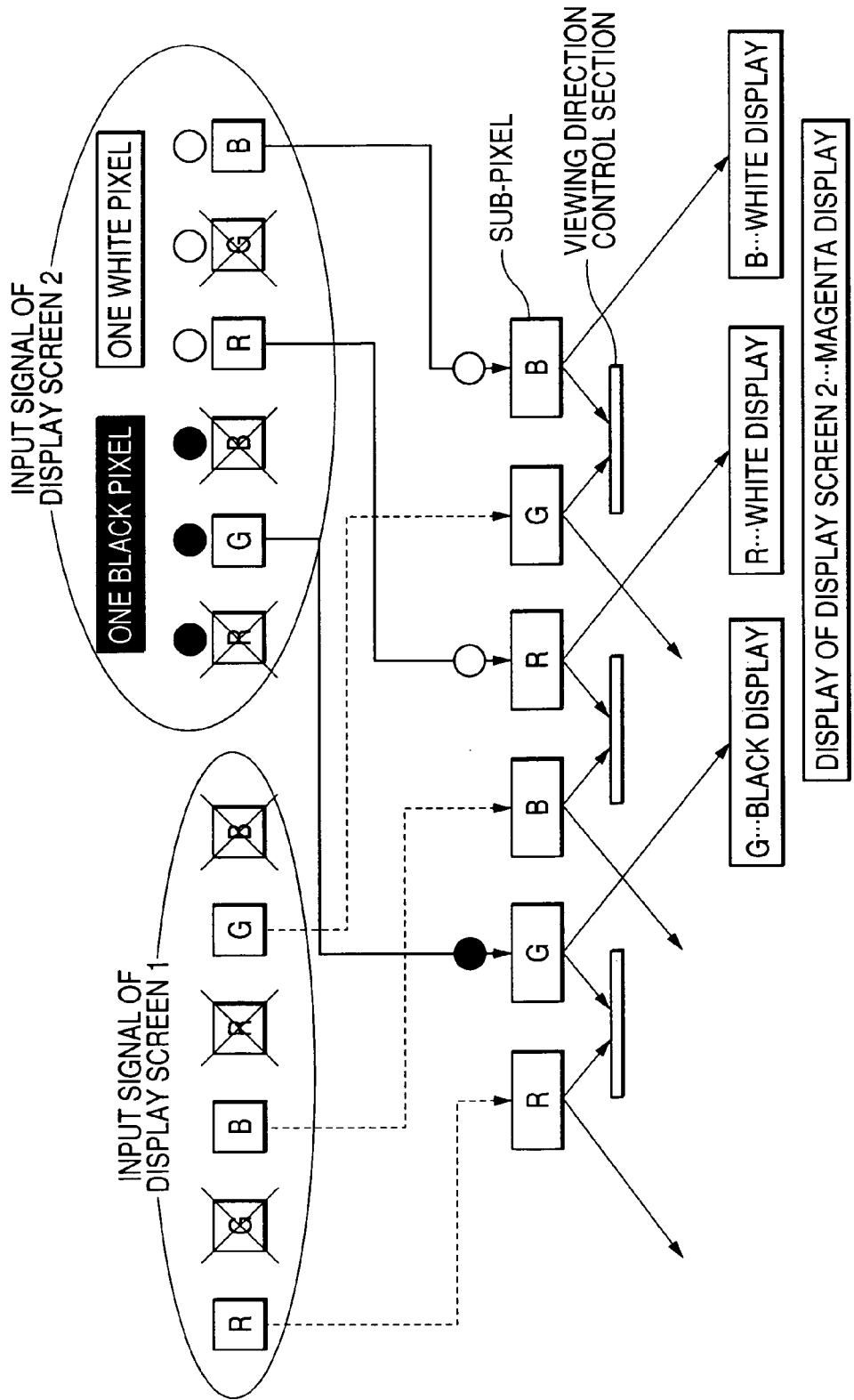
FIG. 21 shows a comparison example of throwing-out processing.

FIG. 21 shows a comparison example of throwing-out processing. In the comparison example, number of pixels of each of the first and second video source signals 3, 4 in the horizontal direction is equal to that of the display section 7 in the horizontal direction. For example, the first video source signal 3, the second video source signal 4 and the display section 7 have 800×480 pixels (VGA). As shown in FIG. 21, three sub-pixels are thrown out from adjacent two pixels of each video source signal.

For example, it is assumed that the second video source signal 4 indicates displaying black and white alternately every other pixels. The display control section 5 throws out three sub-pixels from the adjacent two pixels of the second video source signal 4 as shown in FIG. 21, and then allots the remaining three sub-pixels of the second video source signal 4 to R, G and B sub-pixels of the display section 7. In the comparison example, the resultant color displayed based on the second video source signal 4 is not black or white, which is indicated by the original second video source signal 4, but is magenta. To the contrary, the compression processing of this embodiment does not cause such a problem. In terms of accurate color reproduction, this embodiment is superior to the comparison example.

However, in order to generate the video signal by executing the above-described compression processing, hardware to be used for the compression processing is needed. This may increase cost of the display device and deteriorate image quality due to the compression processing.

Accordingly, the display device according to this embodiment of the invention may have a video signal generating section including a control unit (denoted by reference numeral 200 in FIG. 6) and its peripheral circuits, which will be described later. The video signal generating section arranges pixels of each of n video source signals at predetermined intervals in a first direction to generate the video signal. Each of the n video source signal indicates a video picture in which second particular number of pixels are arranged in the first direction. First particular number of pixels are arranged in the first direction in the display section. The second particular number is less than the first particular number.

Figure 5:
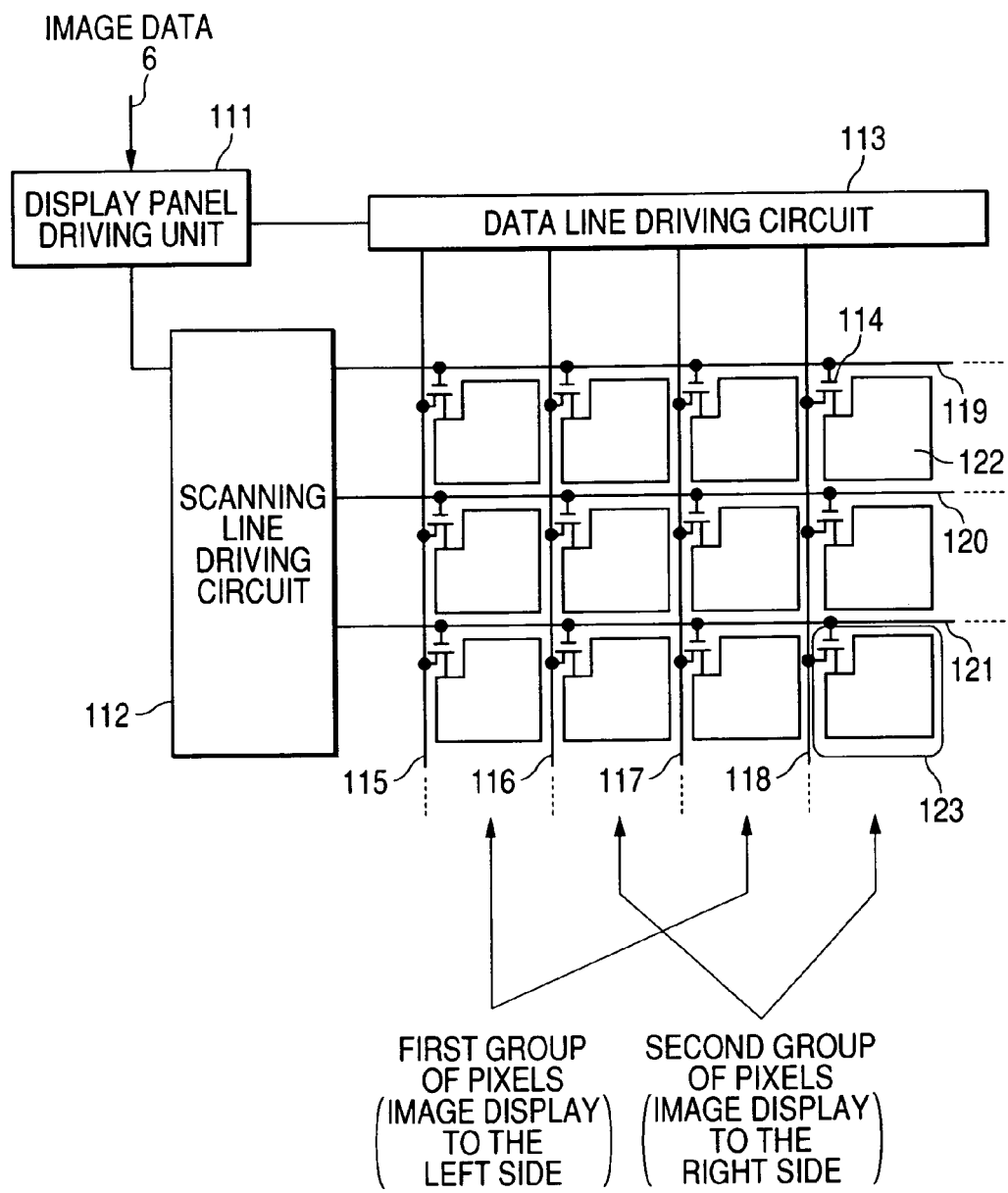
FIG. 5 is a schematic circuit diagram of a TFT substrate.

FIG. 5 is a schematic circuit diagram of the TFT substrate 104. In the figure, reference numeral 111 denotes a display panel driving section, reference numeral 112 denotes a scanning line driving circuit, reference numeral 113 denotes a data line driving circuit, reference numeral 114 denotes a TFT element, reference numerals 115 to 118 denote data lines, reference numerals 119 to 121 denote scanning lines, reference numeral 122 denotes a pixel electrode, and reference numeral 123 denotes a sub-pixel.

As shown in FIG. 5, a plurality of sub-pixels 123 are formed in regions, which are surrounded by data lines 115 to 118 and scanning lines 119 to 121 as sub-pixel units. Each sub-pixel 123 includes the pixel electrode 122 for applying a voltage to the liquid crystal layer 105 and the TFT element 114 for controlling switching of the pixel electrode 122. The display panel driving section 111 controls driving timing of the scanning line driving circuit 112 and data line driving circuit 113. The scanning line driving circuit 112 executes selective scanning of the TFT elements 114 and the data line driving circuit 113 controls application voltage to the pixel electrodes 122.

The plurality of sub-pixels 123 include a first sub-pixel group for displaying the first display image 8 and a second sub-pixel group for displaying the second display image 9. For example, based on the video signal generated by combining the first and second video source data 3, 4 or the respective first and second video source data 3, 4, the display panel driving section 111 transmits first pixel data (used for displaying the first display image 8 (left display image)) to the data lines 115 and 117, and transmits second pixel data (used for displaying the second display image 9 (right image display)) to the data lines 116 and 118.

Figure 6:
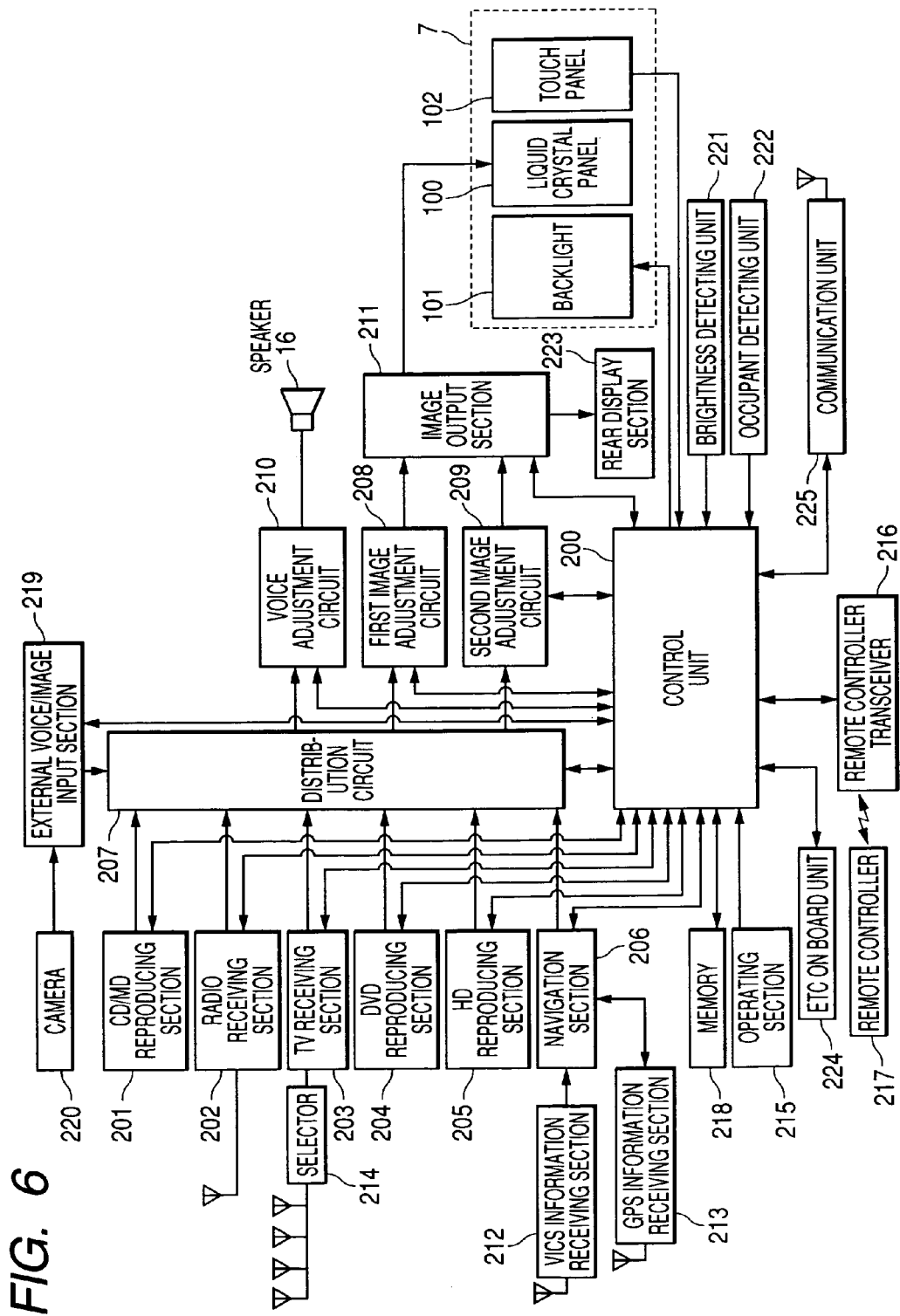
FIG. 6 is a schematic block diagram of the display device according to one embodiment of the invention.

FIG. 6 is a schematic block diagram of the display device according to this embodiment of the invention and shows an example in which the display device is applied to a so-called audio/visual navigation system. In the figure, reference numeral 102 denotes a touch panel, reference numeral 200 denotes a control unit, reference numeral 201 denotes a CD/MD reproducing section, reference numeral 202 denotes a radio receiving section, reference numeral 203 denotes a TV receiving section, reference numeral 204 denotes a DVD reproducing section, reference numeral 205 denotes a HD (hard disk) reproducing section, reference numeral 206 denotes a navigation section, reference numeral 207 denotes a distribution circuit, reference numeral 208 denotes a first image adjustment circuit, reference numeral 209 denotes a second image adjustment circuit, reference numeral 210 denotes a voice adjustment circuit, reference numeral 211 denotes an image output section, reference numeral 212 denotes VICS information receiving section, reference numeral 213 denotes a GPS information receiving section, reference numeral 214 denotes a selector, reference numeral 215 denotes an operating section, reference numeral 216 denotes a remote controller transceiver, reference numeral 217 denotes a remote controller, reference numeral 218 denotes a memory, reference numeral 219 denotes an external voice/image input section, reference numeral 220 denotes a camera, reference numeral 221 denotes a brightness detecting unit, reference numeral 222 denotes an occupant detecting unit, reference numeral 223 denotes a rear display section, reference numeral 224 denotes an on-vehicle ETC (Electronic Toll Collection) unit, and reference numeral 225 denotes a communication unit.

The display section 7 includes the touch panel 102, the liquid crystal panel 100, and the backlight 101. The liquid crystal panel 100 of the display section 7 can substantially simultaneously display an image, which can be seen from the driver's seat side (in the first viewing direction), and an image, which can be seen from the passenger's seat side (in the second viewing direction), as described above. Instead of the liquid crystal panel, the display section 7 may include a flat panel display such as an organic EL display panel, a plasma display panel, a cold cathode flat panel display, etc.

The distribution circuit 207 distributes images and voice input from various sources (the CD/MD reproducing section 201, the radio receiving section 202, the TV receiving section 203, the DVD reproducing section 204, the HD reproducing section 205 and the navigation section 206) on the basis of the instructions input from the control unit. For example, the distribution circuit 207 distributes video source designated for the left side to the first image adjustment circuit 208 and video source designated for the right side to the second image adjustment circuit 209. Specifically, the control unit 200 distributes through the distribution circuit 207, video source and/or image to the first image adjustment circuit 208 and the second image adjustment circuit 209 and voice data to the voice adjustment circuit 210. Then, the first and second image adjustment circuits 208 and 209 adjust brightness, color tone and contrasts of the images (video pictures) and cause the display section 7 to display the adjusted images thereon through the image output section 211. In addition, the voice adjustment circuit 210 adjusts distribution of the voice to the speakers 16 and volume of the voice and causes the speaker 16 to output the adjusted voice. The TV receiving section 203, the DVD reproducing section 204, the HD reproducing section 205 and the navigation section 206 may output image data (video sources) of various pixel sizes such as 400×234 pixels. (EGA), 800×480 (VGA), and the like.

Figure 23:
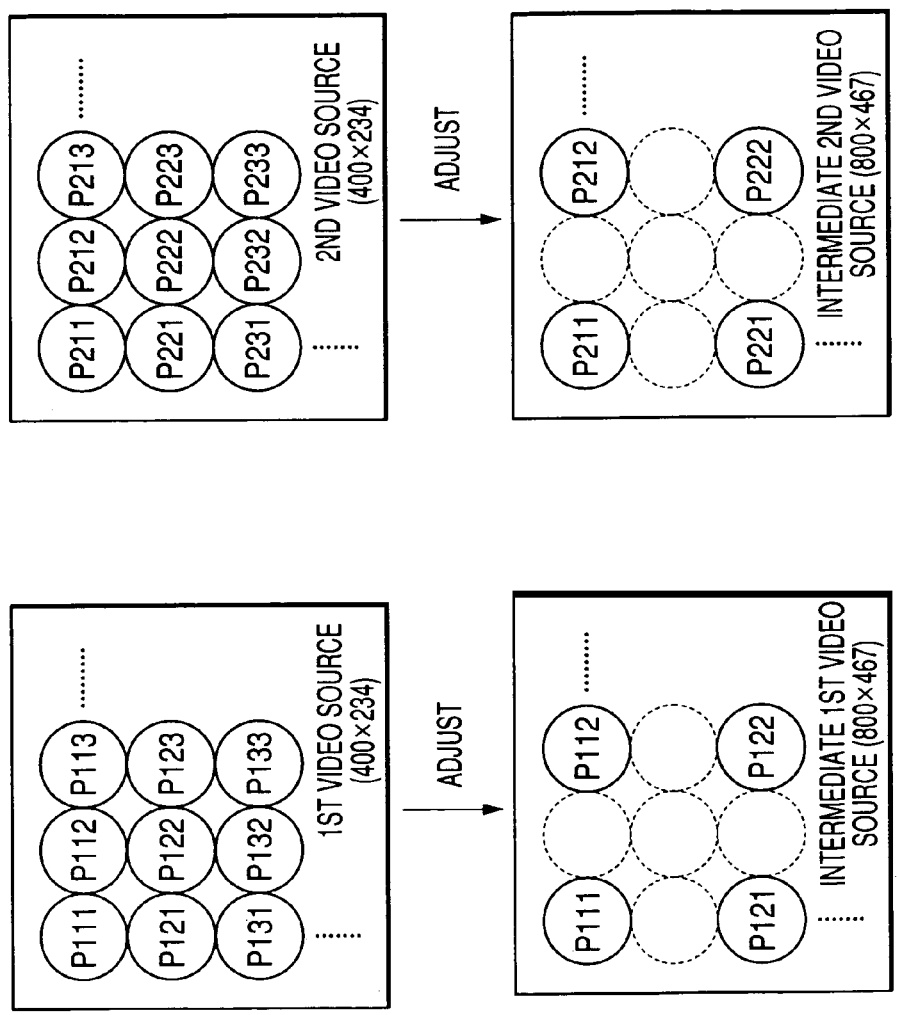
FIG. 23 shows an explanatory view of adjustment processing executed by first and second image adjustment circuits 208, 209.
Figure 24:
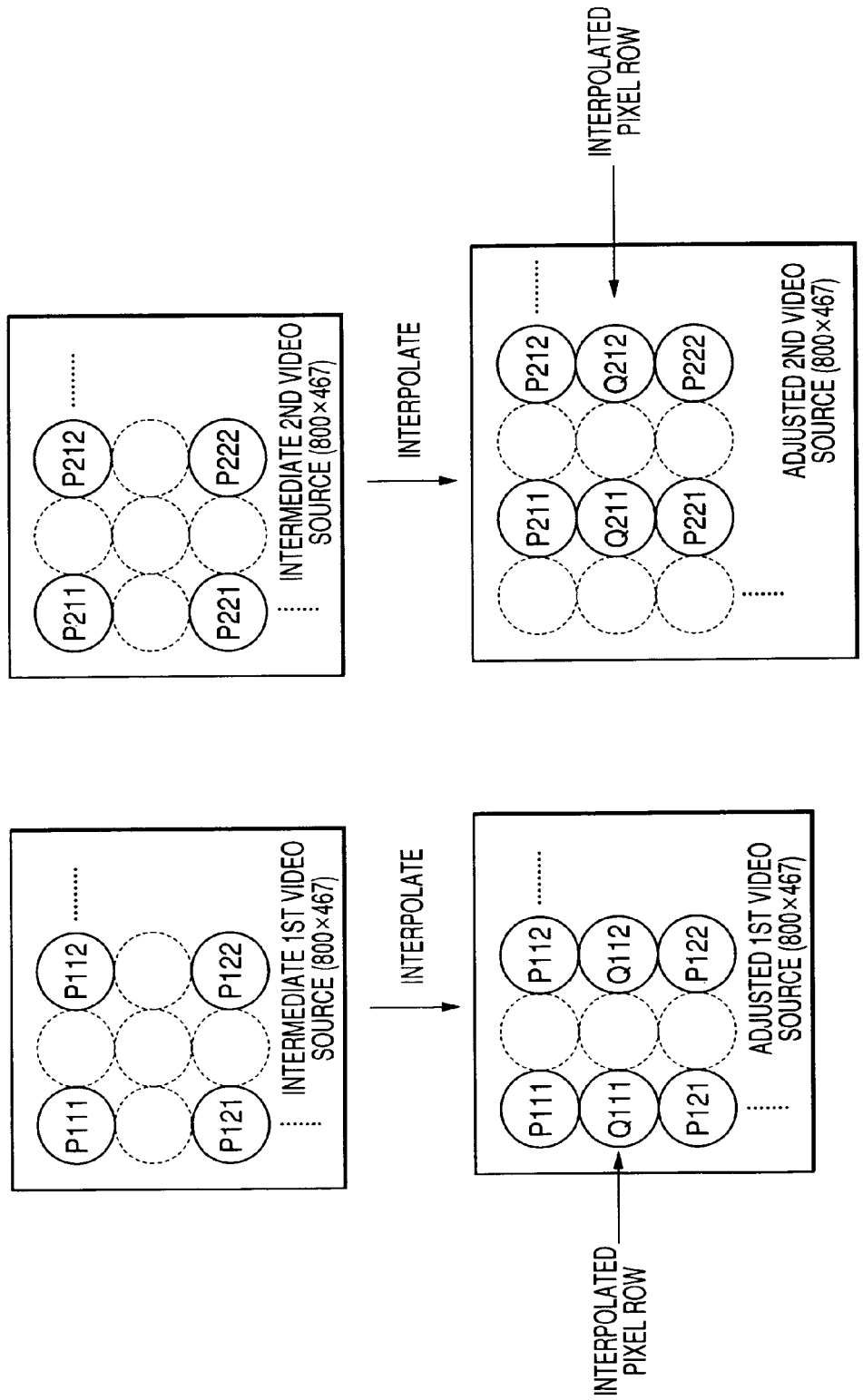
FIG. 24 shows an explanatory view of interpolation processing executed by the first and second image adjustment circuits 208, 209.
Figure 25:
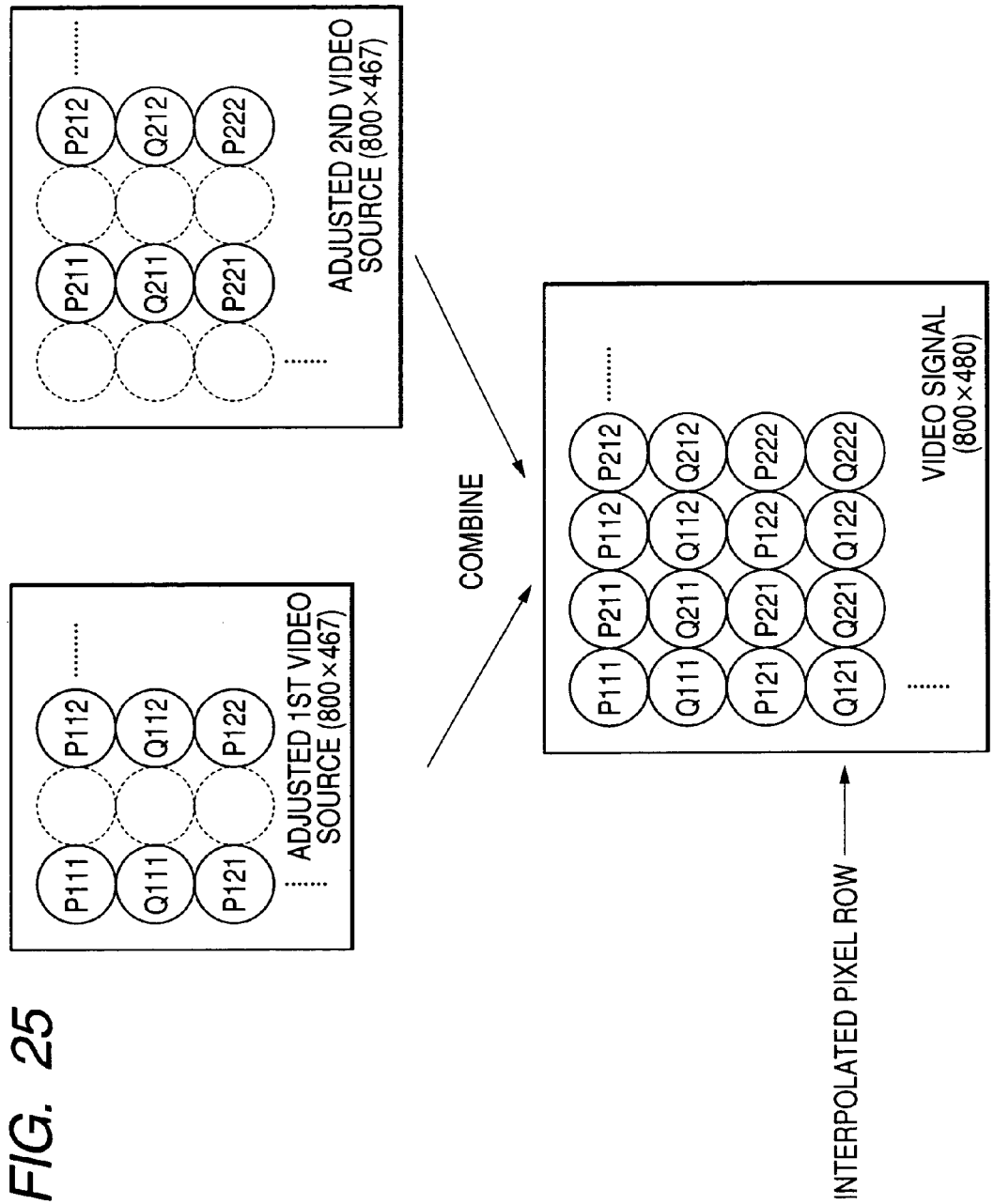
FIG. 25 shows an explanatory view of combining processing executed by an image output section 211.

The video signal generating section will be described in more detail. The control unit 200 first switches the distribution circuit 207 so as to supply a first video source corresponding to an EGA of a pixel size of 400×234, which is to be displayed on the left side (passenger's seat side), to the first image adjustment circuit 208 and a second video source corresponding to an EGA of a pixel size of 400×234, which is to be displayed on the right side (driver's seat side), to the second image adjustment circuit 209. Then, the first image adjustment circuit 208 and the second image adjustment circuit 209 arrange pixels of the respective first and second video sources at one-pixel intervals in the horizontal direction (a first direction), arranges the pixels of the respective first and second video sources at predetermined intervals in the vertical direction (a second direction) and fills interpolation pixels, which are generated from a certain number of vertically adjacent pixels, between the pixels adjacent to each other in the vertical direction. For example, it is assumed that the first and second video sources each having 400×234 pixels (EGA) indicate images shown in FIG. 23. For the sake of explanation, reference numeral such as P111, P211 or the like are assigned to the respective pixels of the first and second video source signals 3, 4. The first image adjustment circuit 208 arranges the pixel data of the first video source 3 so that the pixel data are located every other pixel in the horizontal direction and in the vertical direction. In other words, the first image adjustment circuit 208 inserts dummy pixels between adjacent pixels of the first video source in both the horizontal direction and the vertical direction (see the lower left part of FIG. 23). In FIGS. 23 to 25, circles drawn by the dotted lines represent the dummy pixels. Then, the first image adjustment circuit 208 calculates interpolating pixels based on pixels adjacent to each other in the vertical direction, and fills the calculated interpolating pixels between the adjacent pixels. For example, as shown in the left part of FIG. 24, a pixel Q111 may be calculated by an arithmetic average of pixels P111 and P121, which are adjacent to each other in the vertical direction just before interpolating. As a result, the first image adjustment circuit 208 obtains the adjusted first video source including 800×467 pixels shown in the lower left part of FIG. 24. The second image adjustment circuit 209 adjusts the second video source in a similar way, to thereby obtain the adjusted second video source. Unlike the first image adjustment circuit 208, the second image adjustment circuit 209 moves in parallel all the pixels of the intermediate second video source shown in the right upper part of FIG. 24 by one pixel toward the right direction before the interpolating.

Both of the adjusted first and second video sources are output to the image output section 211. Then, the image output section 211 combines the first and second video sources so as to alternately arrange each pixel column of the first and second video sources in the horizontal direction, thereby to generate a video signal corresponding to VGA of a pixel size of 800×480. For example, the image output section 211 superposes the adjusted second video source except the dummy pixels, onto the adjusted first video source. Here, the resultant video source includes 800×467 pixels. Therefore, the image output section 211 adds black pixel block including black pixels of 800×13 below the resultant video source. Accordingly, the image output section 211 obtains the video signal of 800×480 pixels (VGA). The operation of the output section 211 will be described in detail with reference to FIG. 7 later.

Figure 26:
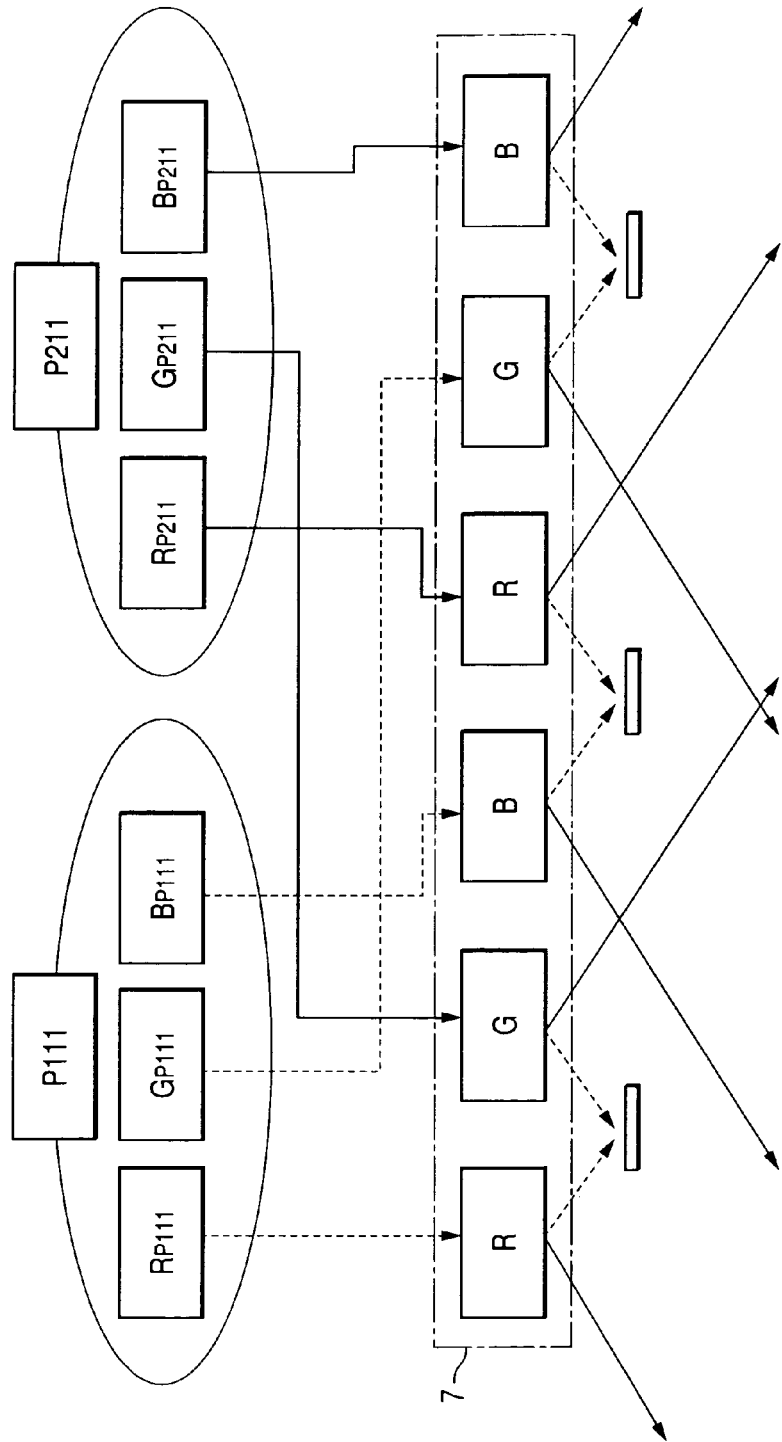
FIG. 26 shows an explanatory diagram of R, G, and B component arrangement.

The image output section 211 outputs the video signal to the display section 7. When displayed, for example, the pixel data of the video signal are allotted to pixels of the liquid crystal panel as shown in FIG. 26 as with FIG. 22.

In other words, the video signal generating section arranges pixels of each of n video source signals at predetermined intervals in a first direction in which a video picture is divided by the parallax barriers 108 to generate the video signal. Each of the n video source signals indicates a video picture in which second particular number of pixels are arranged in the first direction. First particular number of pixels are arranged in the first direction in the display section 7. The second particular number is equal to or less than one nth of the first particular number where n denotes natural number greater than 1. As a result, the video signal is obtained from the first and second video sources without any throwing-out processing.

The video signal generation may execute the following processing. It is assumed that particular number of pixels are arranged in a first direction in the display section 7. When number of the pixels of each of plural video source signals in a first direction is equal to or less than one nth of particular number where n denotes natural number greater than 1, the video signal generation section arranges pixels of each of the plural video source signals at predetermined intervals in the first direction to generate the video signal. Also, when the number of the pixels of each of the plural video source signals in the first direction is greater than one nth of the particular number, the video signal generation section: compresses each of the plural video source signals into a modified video source signal; and arranges the pixels of the modified video source signal at predetermined intervals in the first direction to generate the video signal. Number of pixels of the modified video source signal in the first direction is equal to or less than one nth of the first particular number. In this case, the display device may further include a determining section that determines whether or not the compression processing should be executed in accordance with the number of pixels of the video source signal. Also, the processing executed by the first and second image adjustment circuits 208 and 209 are switched based on the result of the determination.

In addition, the video signal generating section arranges the pixels of the two types of the video source signals in the first direction in predetermined order alternately so as to correspond to arrangement of three primary color components of the pixels of the screen, which correspond to three primary color components of the pixels of the two types of the video source signals. Thereby, color arrangement of the video signal, which is the combined image, is made to be identical with color arrangements of the original video source signals. This matter will be described in detail in the following embodiments.

Figure 7:
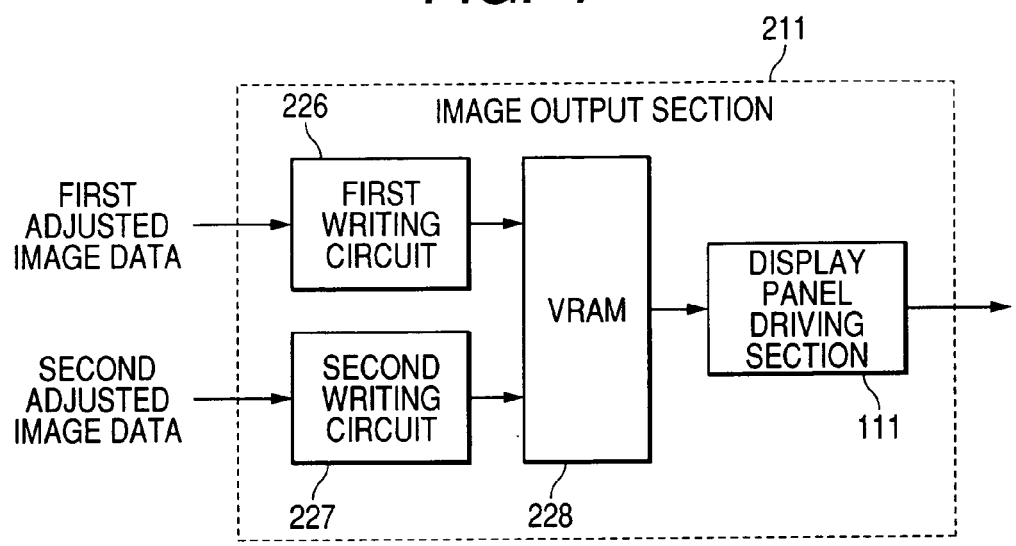
FIG. 7 is a schematic block diagram of an image output section 211.

FIG. 7 is a schematic block diagram of the image output section 211. In the figure, reference numeral 226 denotes a first writing circuit, reference numeral 227 denotes a second writing circuit, and reference numeral 228 denotes a VRAM (video RAM).

The image output section 211 includes the first writing circuit 226, the second writing circuit 227, the VRAM (video RAM) 228 and the display panel driving section 111 as shown in FIG. 7. For example, the first writing circuit 226 extracts odd number column data (that is, image data for the first display image 8 in FIG. 1) from the adjusted first video source, which is output from the first image adjustment circuit 208, and writes the extracted data to a corresponding region in the VRAM 228. The second writing circuit 227 extracts even number column data (that is, image data for the second display image 9 in FIG. 1) from the adjusted second video source, which is output from the second image adjustment circuit 209, and writes the extracted data to a corresponding region in the VRAM 228. The display panel driving section 111 is a circuit for driving the liquid panel 100. The display panel driving section 111 drives counterpart pixels of the liquid crystal display panel 100 based on the video signal (combined data of the first video source and the second video source) stored in the VRAM 228. In addition, since the image data are written into the VRAM 228 so as to correspond to an image for multi-view display in which the first video source and the second video source are combined, a single driving circuit is required. The display panel driving section 111 has the same operation as driving circuits for the typical liquid crystal display devices. Also, the display panel driving section 111 operates in a similar manner to the driving circuits for the typical liquid crystal display devices. As another configuration example, a first display panel driving circuit and a second display panel driving circuit may be provided without combining the first video source and the second video source. The first and second display panel driving circuits operate corresponding pixels of the liquid crystal display panel on the basis of the first and second video sources, respectively.

Examples of the various sources shown in FIG. 6 will be described here. When the HD reproducing section 205 is selected, music data such as a MP3 file, image data such as a JPEG file, map data for navigation, etc. stored in a hard disk (HD) are read out, and a menu for selecting the music data or the image data can be displayed on the display section 7.

The navigation section 206 includes a map information storing section in which map information used for navigation is stored. The navigation section 206 obtains information from VICS (Vehicle Information and Communication System) information receiving section 212 and the GPS information receiving section 213 to generate and display images for navigation operation. Also, the TV receiving section 203 receives analog TV broadcast waves and digital TV broadcast waves from an antenna through the selector 214.

Figure 8:
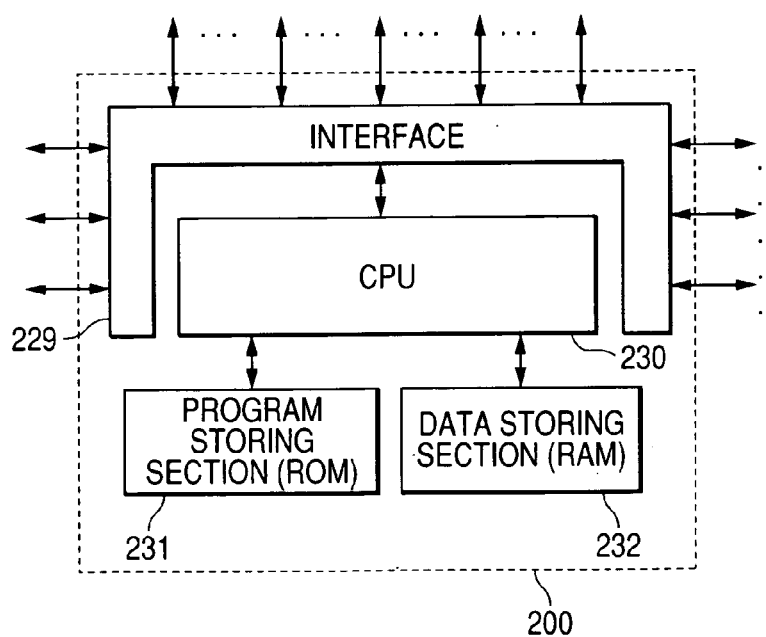
FIG. 8 is a schematic block diagram of a control unit 200.

FIG. 8 is a schematic block diagram of the control unit 200. In the figure, reference numeral 229 denotes an interface, reference numeral 230 denotes a CPU, reference numeral 231 denotes a program storing section, and reference numeral 232 denotes a data storing section.

The control unit 200 controls the distribution circuit 207 and the various sources to display one or two selected sources on the display section 7. Also, the control unit 200 displays an operation menu for control of these sources on the display section 7. As shown in FIG. 8, the control unit 200 includes a microprocessor or the like and includes the CPU 230 for generally controlling parts or circuits in the display device through the interface 229. The CPU 230 includes the program storing section 231 such as a ROM storing various programs required for operation of the display device, and the data storing section 232 such as a RAM storing various data. ROM or RAM may be built in or external to the CPU. Also, ROM may be an electrically re-writable nonvolatile memory such as a flash memory.

A user can control the various sources by performing an input operation or a selection operation of the touch panel 102 attached on the surface of the display section 7, a switch provided in the vicinity of the display section 7, or voice recognition through the operation unit 215. In addition, the user may perform an input or selection operation with the remote controller 217 through the remote controller transceiver 216. The control unit 200 executes controls for various sources and the like according to user's operation of the touch panel 102 or the operation unit 215. In addition, the control unit 200 is configured to control volume of a plurality of speakers 16 installed within the car as shown in FIG. 2, using the voice adjustment circuit 210. In addition, the control unit 200 stores various setting information such as image quality setting information, programs, car information, etc., in the memory 218.

Figure 9:
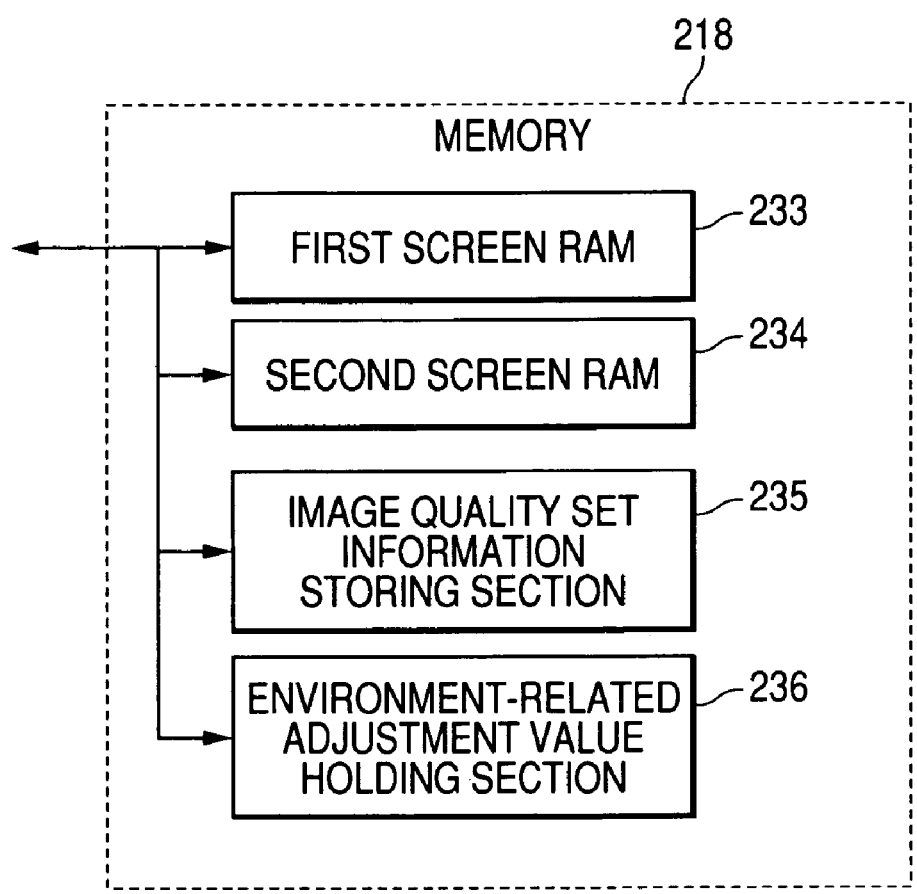
FIG. 9 is a schematic block diagram of a memory 218.

FIG. 9 is a schematic block diagram of the memory 218. In the figure, reference numeral 233 denotes a first screen RAM, reference numeral 234 denotes a second screen RAM, reference numeral 235 denotes an image quality set information storing section, and reference numeral 236 denotes an environment-related adjustment value holding section.

As shown in FIG. 9, the memory 218 includes the first screen RAM 233 and the second screen RAM 234 to which adjustment values of image quality of the first and second images, which are set by the user, are respectively written, for example. In addition, the memory 213 includes the image quality set information storing section 235 in which multi-stepped image quality adjustment values are stored for image quality adjustment as preset values readable when image qualities of the first image and the second image are adjusted. In addition, the memory 218 includes the environment-related adjustment value holding section 236 for holding adjustment values of quality of the first image and the second image for an ambient environment in order to adjust image quality according to the change of the ambient environment such as the change of brightness outside a car. In this embodiment, the image quality set information storing section 235 and the environment-related adjustment value holding section 236 are configured by an electrically re-writable non-volatile memory such as a flash memory or a volatile memory with a backup battery.

An image from the camera 220, which is connected to the external voice/image input section 219, for monitoring the rear of the car may be displayed on the display section 7. In addition to the camera 220 for monitoring the rear of the car, a video camera, a game machine or the like may be connected to the external voice/image input section 219.

The control unit 200 can change settings of a localization position of voice and so on based on information detected by the brightness detecting unit 221 (for example, a light switch or an optical sensor of a car) or the occupant detecting unit 222 (for example, a pressure-sensitive sensor installed in a driver's seat or a passenger's seat).

On the rear display section 223 installed for rear seats of a car, the same image as an image displayed on the display section 7 or either an image for driver's seat or an image for passenger's seat may be displayed via the image output section 211.

The control unit 200 displays a fee output from the ETC on board unit 250. In addition, the control unit 200 may control the communication unit 225 for wireless connection to a mobile telephone or the like and may display information relating to the connection on the display section 7 or the like.

Hereinafter, a display device according to a second embodiment of the invention will be described. The second embodiment will be described based on the block diagram of FIG. 11 in which main parts of the display device are modified in functional units on the basis of the hardware configuration of the display device shown in FIG. 6.

Figure 11:
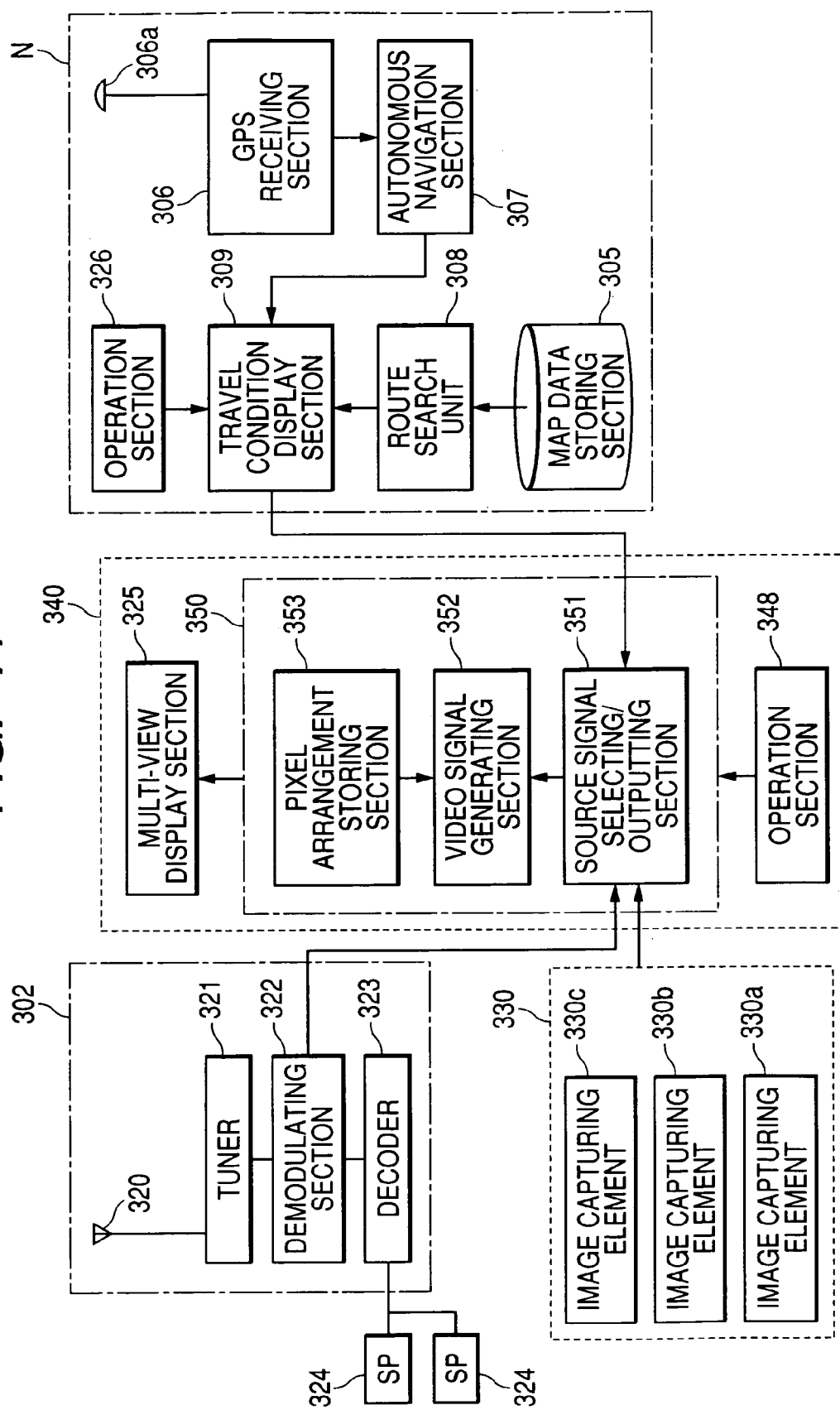
FIG. 11 is a block diagram of a case where a multi-view display device according to one embodiment of the invention is applied to a car navigator mounted on a vehicle.

Referring to FIG. 11, a navigation device N, a radio receiver 302, a multi-view display device (hereinafter, referred to as "display device") 340 and an image capturing element 330 for security are installed in a vehicle. The navigation device N guides the vehicle to its destination. The radio receiver 302 receives terrestrial digital broadcasting. The display device 340 simultaneously displays an image generated in the navigation device N and an image generated in the radio receiver 302.

The navigation device N includes a map data storing section 305, a GPS receiving unit 306, a GPS antenna 306a, an autonomous navigation unit 307, a route search unit 308, a travel condition display section 309 and an operation section 326. The map data storing section 305 stores road map data. The GPS receiving unit 306 recognizes vehicle position information. The autonomous navigation unit 307 manages travel conditions of the vehicle. The route search unit 308 searches a route to a designated destination based on the map data. The travel condition display section 309 displays a vehicle running position on a map. The operation section 326 allows a user to set various operation modes or operation conditions. Also, the navigation device N includes one or more CPUs, a ROM storing an operation program, and a RAM used in a working area in order to control the above-mentioned sections and units. The navigation device N has a navigation function to guide the vehicle to the designated destination.

The radio receiver 302 includes a digital television receiver having a receiving antenna 320, a tuner 321, an OFDM demodulation section 322 and a decoder 323. The tuner 321 selects a transmission channel (frequency band) received through the receiving antenna 320. The OFDM demodulation section 322 extracts a digital signal from the selected received signal, executes error correction processing for the digital signal, and outputs TS (transport stream) packets. The decoder 323 decodes a voice signal and a video signal from image and voice packets contained in the TS packets and outputs the decoded voice signal and the decoded video signal to a speaker 324 and a display section 325, respectively.

A plurality of image capturing elements 330 are disposed in the vehicle. Image capturing elements 330a, 330b and 330c disposed on the outside of the vehicle can be used for a rear monitor or measurement of distance between vehicles.

The navigation device N, the radio receiver 302 and the image capturing element 330 are configured to output source signals corresponding to 400 (horizontal)×234 (vertical) pixels, respectively, and input the source signals into the display device 340 to thereby display video pictures.

The display device 340 includes a multi-view display section (hereinafter referred to as "display section" 325, a source signal converting section and an operation section 348. The display section 325 can display different images for the driver's seat side and the passenger's seat side. The source signal converting section 350 executes predetermined processing with respect to source signals of video pictures to be displayed on the display section 325 to output the processed source signals to the display section 325. The operation section 348 allows an outside (e.g., a user) to select a source signal to be output.

Figure 12:
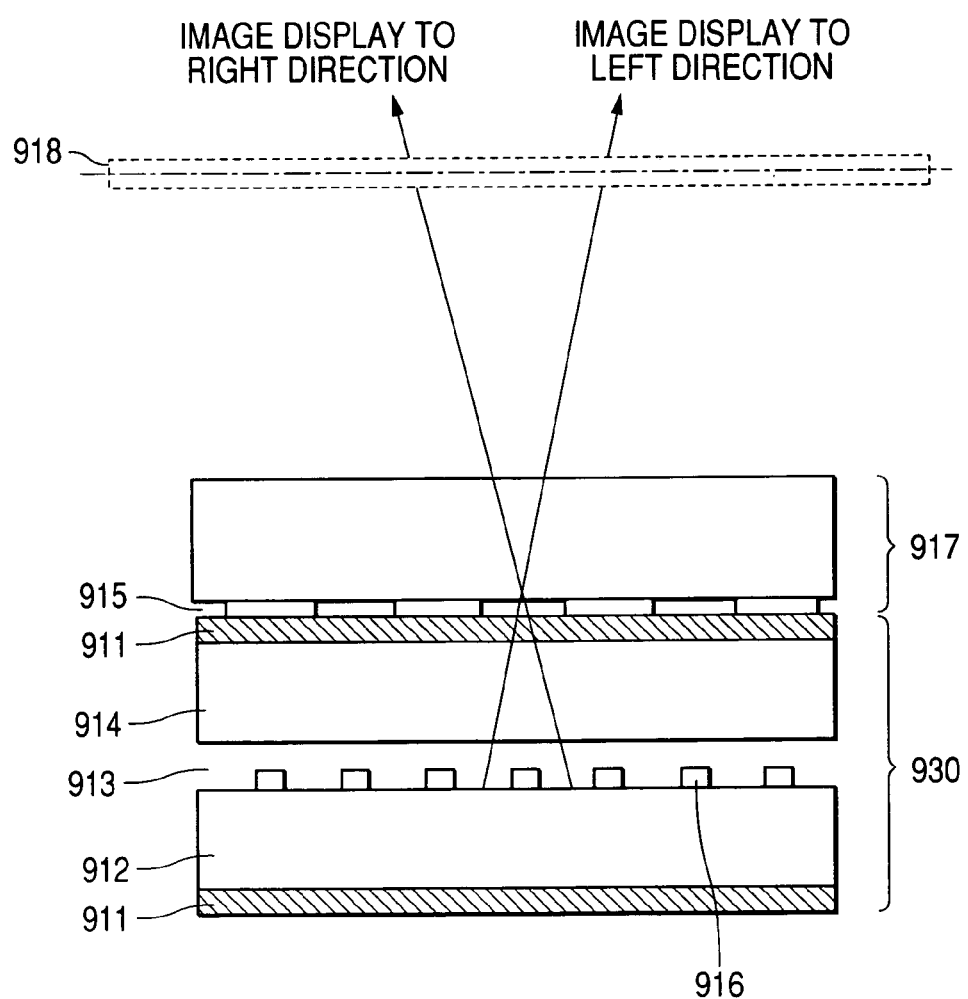
FIG. 12 is an explanatory diagram of a multi-view display section.

As shown in FIG. 12, the display section 325 includes a liquid crystal panel 930 and a parallax barrier substrate 917 integrally. The liquid crystal panel 930 is configured so that a TFT substrata 912 on which a TFT array 916 is formed and an opposite substrate 914 sandwich a liquid crystal layer 913 therebetween and that the TFT substrate 912 and the opposite substrate 914 are disposed between two polarizing plates 911. The parallax barrier substrate 917 includes a parallax barrier layer 915 in which microlenses and light shielding slits, which serve as a viewing direction control section, are formed.

Figure 13:
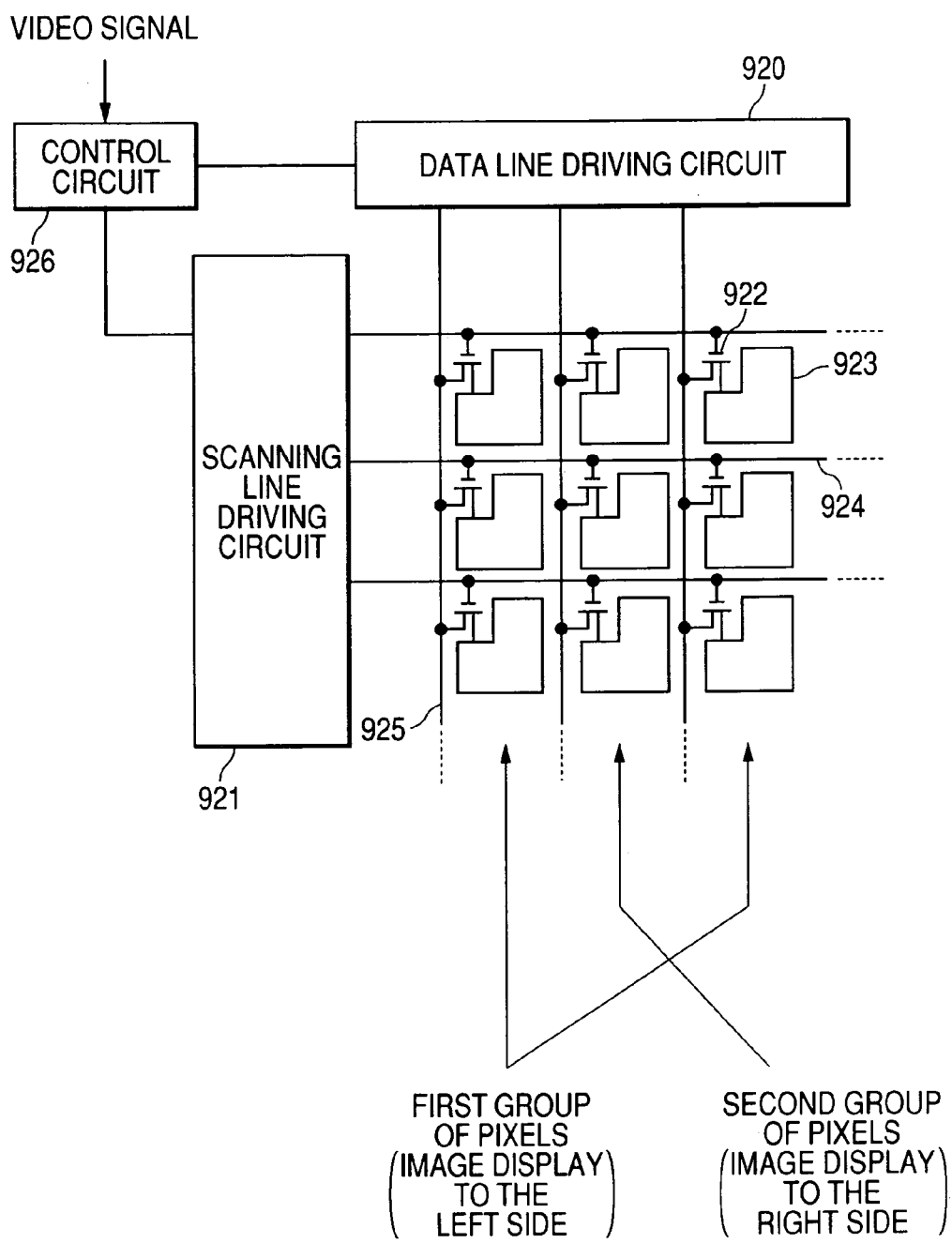
FIG. 13 is an explanatory diagram of a liquid crystal panel.

As shown in FIG. 13, the TFT array 916 includes a plurality of sub-pixels, which are formed in units of regions surrounded by data lines 925 and scanning lines 924. Each sub-pixel includes a pixel electrode 923 for applying a voltage to the liquid crystal layer 913 and a TFT element 922 for controlling switching of the pixel electrode 923. A scanning line driving circuit 921 performs selective scanning of the TFT elements 922. A data line driving circuit 920 controls application voltage to the pixel electrodes 923. A control circuit 926 controls driving timing of the scanning line driving circuit 921 and the data line driving circuit 920.

The plurality of sub-pixels are divided into two groups of sub-pixels, that is, a first group of sub-pixels and a second group of sub-pixels, which are arranged (classified into odd number columns and even number columns) every other columns (every other data lines). The two groups of sub-pixels are separately driven based on different video signals from different sources. Since the parallax barrier layer 915 leads light beams passing through the two groups of sub-pixels to different directions or shields a light beam in a certain direction, it is possible to display different images (video pictures) in different directions only in the neighborhood of a display plane 918 on the space. That is, it is possible to simultaneously display different images (video pictures) in two directions.

Figure 14:
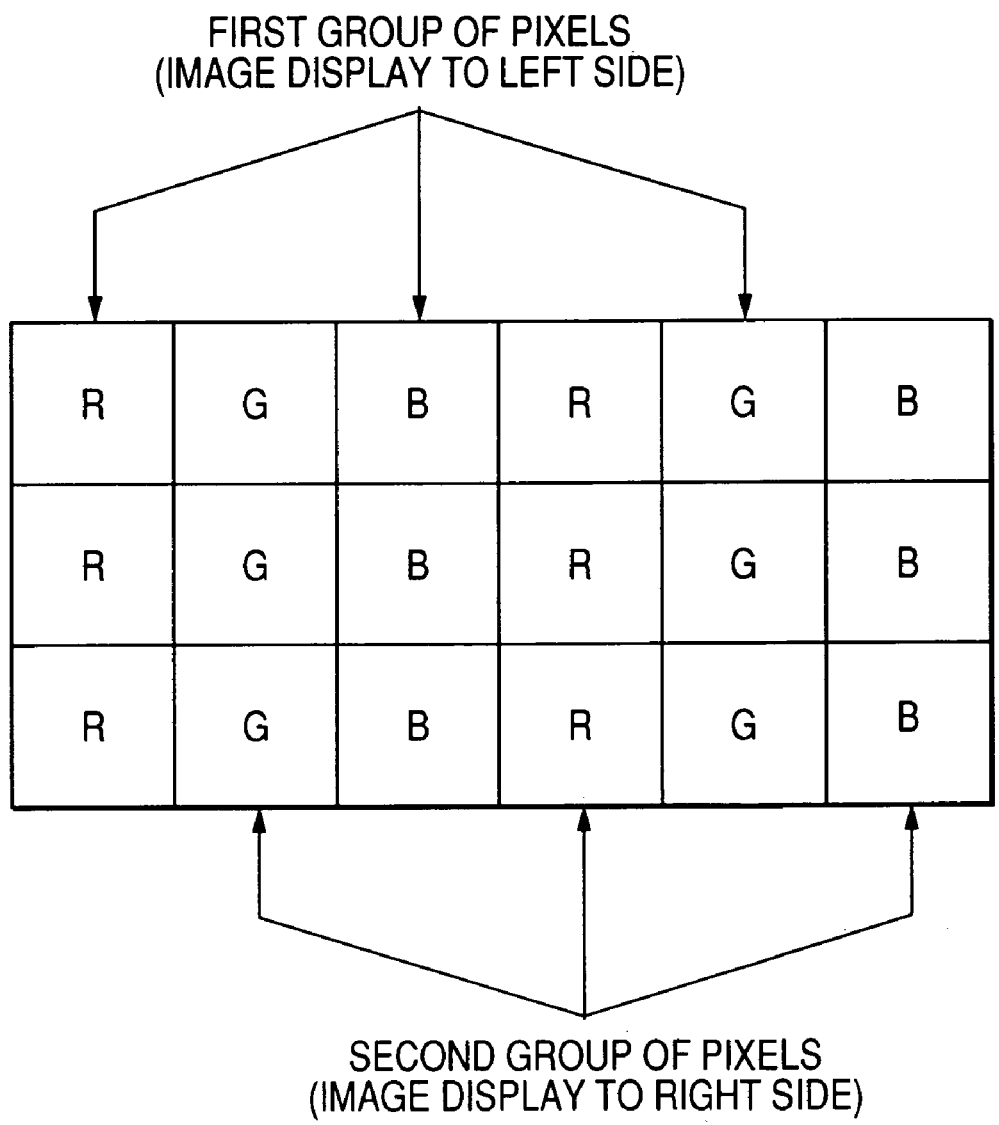
FIG. 14 is an explanatory diagram of R, G, and B component arrangement.

The sub-pixel is configured to display one of three R, G and B primary colors with a color filter or the like. Also, as shown in FIG. 14, R, G and B color sub-pixels are alternately arranged in the horizontal direction (the first direction) and the same color sub-pixels are arranged in the form of a stripe in the vertical direction (the second direction).

In each of the first group of sub-pixels and the second group of sub-pixels, three sub-pixels contiguous in the horizontal direction is handled as one unit, thereby to form one pixel having three primary colors. In addition, each of the first group of sub-pixels and the second group of sub-pixels has 400 columns of pixels (1200 columns of sub-pixels) in the horizontal direction (the first direction) and 234 rows of pixels (234 rows of sub-pixels) in the vertical direction (the second direction). That is, the display section 325 has 800× 234 pixels. The display section 325 displays an image of 400 pixels×234 pixels using the first group of sub-pixels, that is, a first group of pixels, and displays an image of 400 pixels×234 pixels using the second group of sub-pixels, that is, a second group of pixels.

The display section 325 is installed on a front panel in the middle between the driver's seat and the passenger's seat and is configured so that an image observed from the driver's seat side is displayed differently from an image observed from the passenger's seat side. For example, while image information from the radio receiver 302 is observed from the passenger's seat side, map information of the navigation device N can be observed from the driver's seat side.

Returning to FIG. 11, the source signal converting section 350 includes a source signal selecting/outputting section 351, a video signal generating section 352 and a pixel arrangement storage section 353. The source signal selecting/outputting section 351 selects source signals, which are selected by the operation section 348 from among the plurality of source signals and used to display video pictures on the driver's seat side and the passenger's seat side. The video signal generating section 352 rearranges pixel data of the source signals selected by the source signal selecting/outputting section 351 so that the pixel data correspond to sub-pixel arrangement or pixel arrangement of the display section 325, and inputs the rearranged pixel data to the display section 325. The pixel arrangement storage section 353 stores information on the sub-pixel arrangement of the display section 325 and information on the pixel arrangement of the display section 325.

Figure 15:
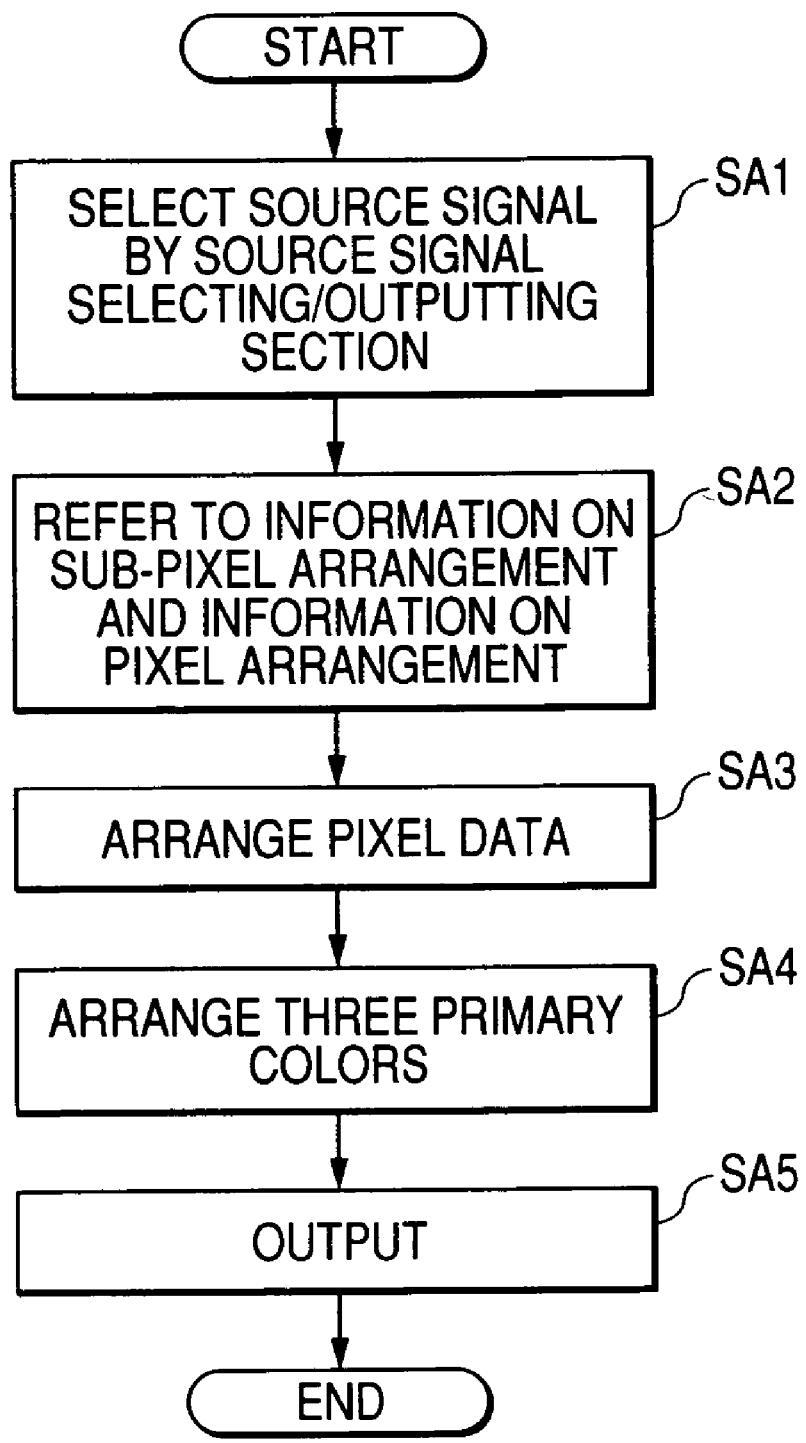
FIG. 15 is a flow chart illustrating operation of a source signal converting section according to a second embodiment.

Hereinafter, operation of the source signal converting section 350 will be described with reference to a flow chart shown in FIG. 15.

When video pictures to be displayed on the display section 325 and observed from the driver's seat side and the passenger's seat side are selected through the operation section 348, the source signal selecting/outputting section 351 selects source signals corresponding to the selected video pictures (SA1).

The video signal generating section 352 refers to the information on the sub-pixel arrangement of the display section 325 and the information on the pixel arrangement of the display section 325, which are stored in the pixel arrangement storage section 353 (SA2). Then, the video signal generating section 352 arranges pixel data of the selected source signals so that the pixel data correspond to the information of the sub-pixel arrangement and the information of the pixel arrangement (SA3). The video signal generating section 325 outputs video signals with three primary color components of the pixel data arranged (SA4 and SA5).

For example, as shown in FIG. 14, in the horizontal direction (the first direction) of the display section 325, the sub-pixels are repeatedly arranged in order of R, G, and B while sub-pixels in the first group of sub-pixels (group of pixels) and the second group of sub-pixels are arranged in order of R, B, and G. In addition, while sub-pixels of a first column in the first group of sub-pixels starts from R, sub-pixels of a first column in the second group of sub-pixels starts from G. The video signal generating section 352 arranges three primary color components of the pixel data such that the pixel data correspond to the R, G, and B sub-pixels and outputs the arranged three primary color components of the pixel data. That is, the video signal generating section 352 arranges and outputs the pixel data so that pixel data for R are input to the R sub-pixel, pixel data for G are input to the G sub-pixel, and pixel data for B are input to the B sub-pixel. In addition, the video signal generating section 352 arranges the pixel data so as to be input so that three consecutive R, G, and B sub-pixels in each group of sub-pixels become an image of one pixel and outputs a video signal.

At this time, since two source signals of an image observed from the driver's seat side and an image observed from the passenger's seat side are arranged, a video signal corresponding to the horizontal direction (the first direction) is expanded twice as much as the single source signal. That is, this video signal has twice the horizontal resolution as compared to the single source signal. However, due to the number of pixels corresponding to the horizontal resolution in the horizontal direction of the display section 325, there is no need to perform throwing-out processing for pixels in the horizontal direction.

Figure 16:
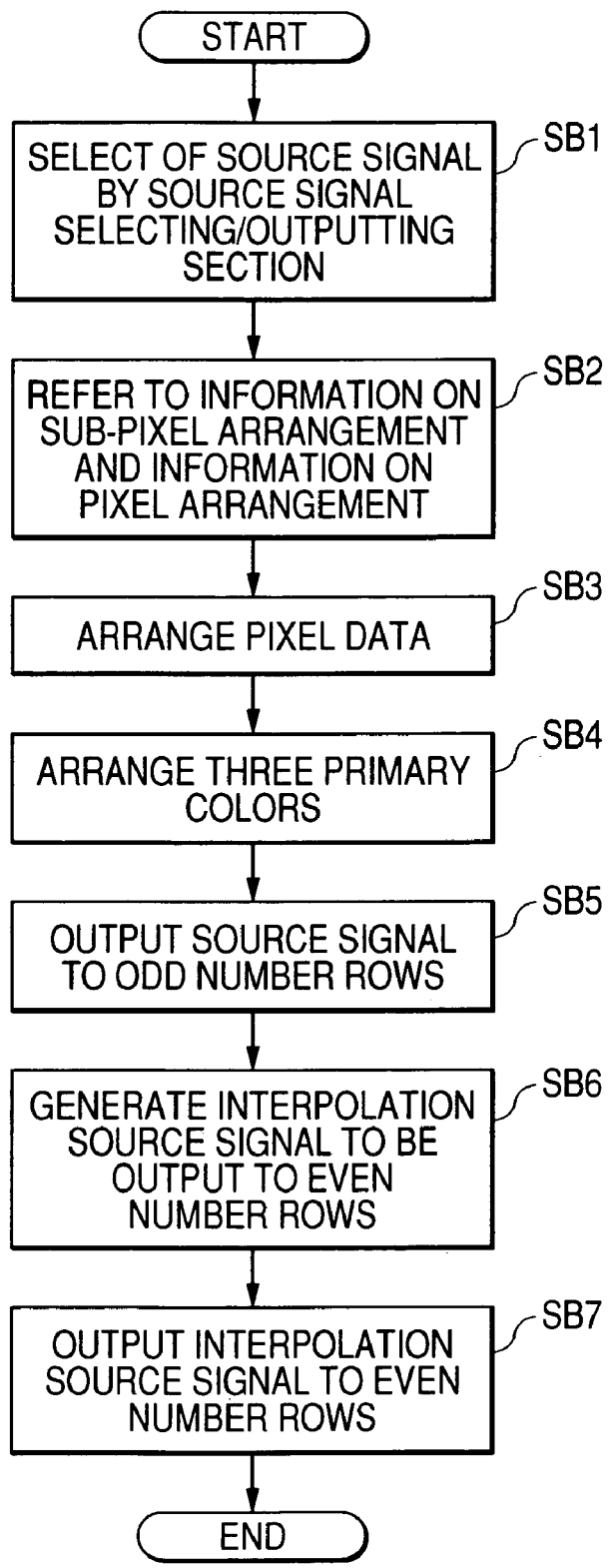
FIG. 16 is a flow chart illustrating operation of a source signal converting section according to a third embodiment.

Now, a third embodiment will be described. The third embodiment in which the number of pixels of the display section 325 is 800×480 will be described with reference to a flow chart shown in FIG. 16. The arrangement of the first group of sub-pixels, the arrangement of the second group of sub-pixels, and R, G and B arrangement (stripe arrangement) in the sub-pixels in the third embodiment are the same as those in the second embodiment.

When the video pictures to be displayed on the display section 325 and observed from the driver's seat side and the passenger's seat side are selected through the operation section 348, the source signal selecting/outputting section 351 selects source signals corresponding to the selected video pictures (SB1).

The video signal generating section 352 refers to the information on the sub-pixel arrangement of the display section 325 and the information on the pixel arrangement of the display section 325, which are stored in the pixel arrangement storage section 353 (SB2). The video signal generating section 352 arranges pixel data of the selected source signals so that the pixel data correspond to the information on the sub-pixel arrangement and the information on the pixel arrangement (SB3). The video signal generating section 352 arranges the three primary color components of the pixel data (SB4).

For example, similar to the second embodiment, the video signal generating section 352 arranges three primary color components of the pixel data so that the pixel data correspond to the R, G, and B sub-pixels in the horizontal direction (the first direction) of the display section 325. That is, the video signal generating section 352 arranges the pixel data such that pixel data for R are input to the R sub-pixel, pixel data for G are input to the G sub-pixel, and pixel data for B are input to the B sub-pixel. In addition, the video signal generating section 352 arranges the pixel data so as to be input such that three consecutive R, G, and B sub-pixels in each group of sub-pixels become an image of one pixel.

In addition, the video signal generating section 352 outputs the arranged source signals in the vertical direction (the second direction) of the display section 325 so that the source signal corresponds to odd number rows of the sub-pixels (SB5), and generates and outputs an interpolation source signal to the even number rows based on the source signals output to the odd number rows adjacent to the even number rows (SB6 and SB7).

Figure 17:
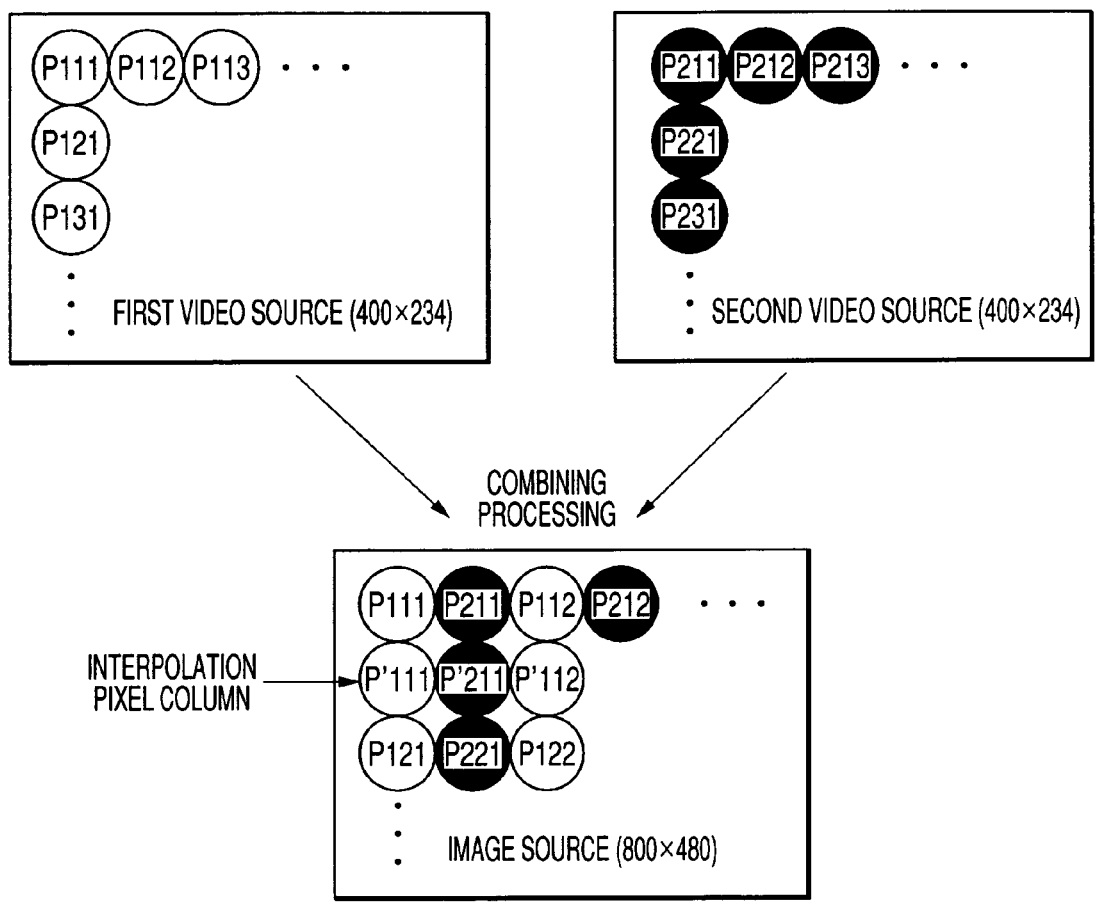
FIG. 17 is an explanatory diagram of a generation order of interpolation pixels.

For example, an arithmetic average of source signals output to sub-pixels of the rows adjacent to each sub-pixel of even number rows is calculated and output as an interpolation source signal of each sub-pixel of the even number rows. In more detail, as shown in FIG. 17, when sub-pixels of pixels constituting one of the source signals are arranged as P111, P112, P113, . . . in the horizontal direction and are arranged as P111, P121, P131, . . . in the vertical direction, the video signal generating section 352 assigns an arithmetic average of the upper arranged pixel P111 and the lower arranged pixel P121 as a value of a sub-pixel P'111 of a first even number row. Likewise, when sub-pixels of pixels constituting the other of the source signals are arranged as P211, P212, P213, . . . in the horizontal direction and are arranged as P211, P221, P231, . . . in the vertical direction, the video signal generating section 352 assigns an arithmetic average of the upper arranged pixel P211 and the lower arranged pixel P221 as a value of a sub-pixel P'211 of a first even number row. In this manner, values of sub-pixels of other even number rows are calculated to generate a video signal.

Alternatively, a source signal output to sub-pixels of the rows adjacent to each sub-pixel of the even number rows may be output as an interpolation source signal of each of sub-pixels constituting the even number rows. In addition, even when a pixel size is not of integral times, the interpolation source signals as pixels to be interpolated can be calculated using the above-described method or can be generated and output using the well-known arts properly.

At this time, since two source signals of an image observed from the driver's seat side and an image observed from the passenger's seat side are arranged, a video signal corresponding to the horizontal direction (the first direction) is expanded twice as much as the single source signal. That is, this video signal has twice the horizontal resolution as compared to the single source signal. However, due to the number of pixels corresponding to the horizontal resolution in the horizontal direction of the display section 325, there is no need to perform throwing-out processing for pixels in the horizontal direction.

In addition, since the interpolation source signal is output to the even number rows, a video signal corresponding to the vertical direction (the second direction) is also expanded twice as much as compared to one of the source signals. That is, the images observed from the driver's seat side and the image observed from the passenger's seat side have no change in their aspect ratios as compared to the original source signals.

In addition, the source signal may be output to the even number rows and the interpolation source signal is generated and output to the odd number rows based on the source signal output to the even number rows adjacent to the odd number rows.

Figure 18:
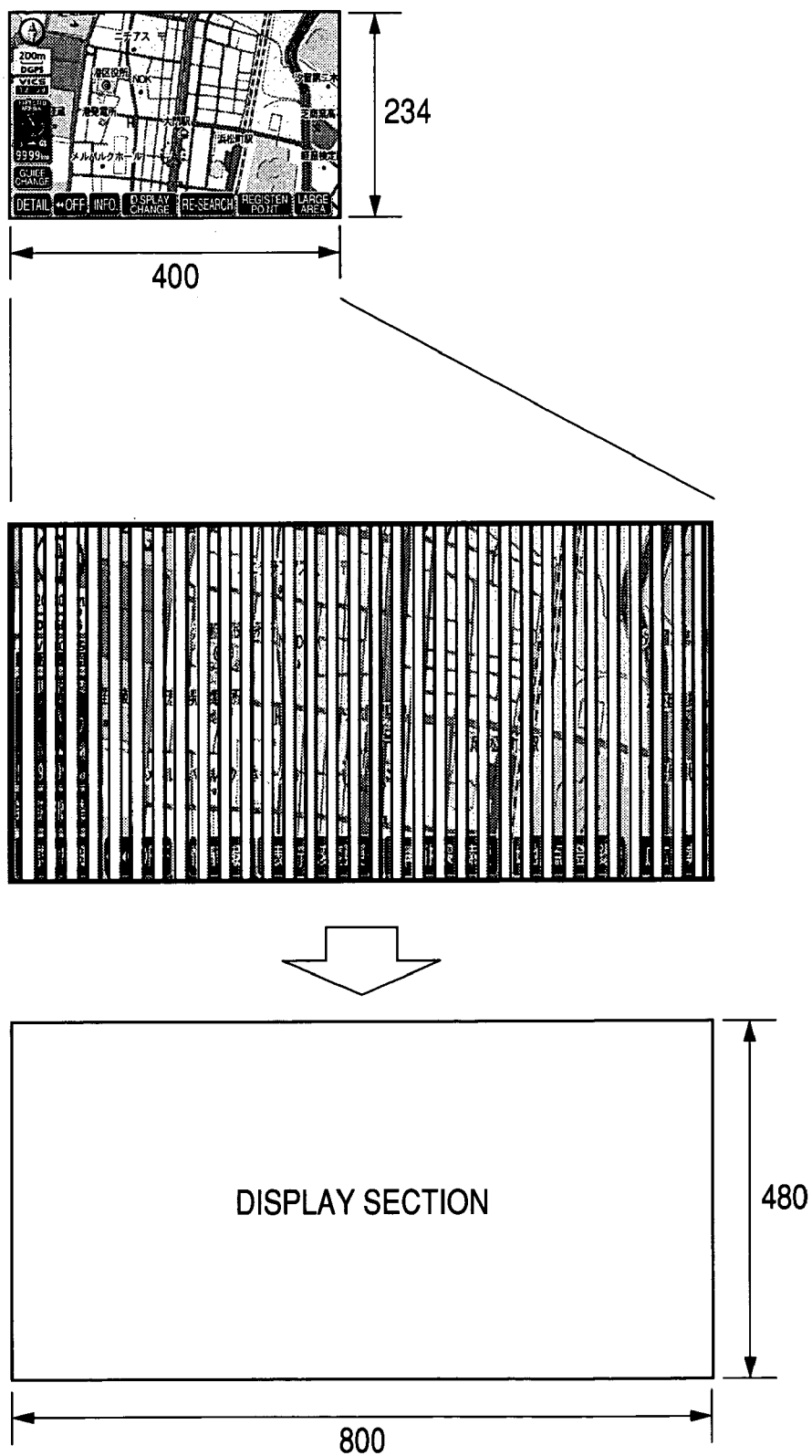
FIG. 18 is an explanatory diagram of a video signal according to the invention.

As a specific example, an image generated from map data as a video source output from the navigation device N by the video signal generating section 352 is shown in FIG. 18. When a video source (an image shown in the top of FIG. 18) corresponding to 400×234 pixels (EGA) output from the navigation device N is selected as a video source signal of the driver's seat side, if this video picture is output to the display section 325 (a frame shown in the bottom of FIG. 18) of 800×480 pixels (VGA), the map data as the image source are expanded in the vertical direction without being compressed in the horizontal direction, to thereby generate a video picture as shown in the middle of FIG. 18.

Figure 20:
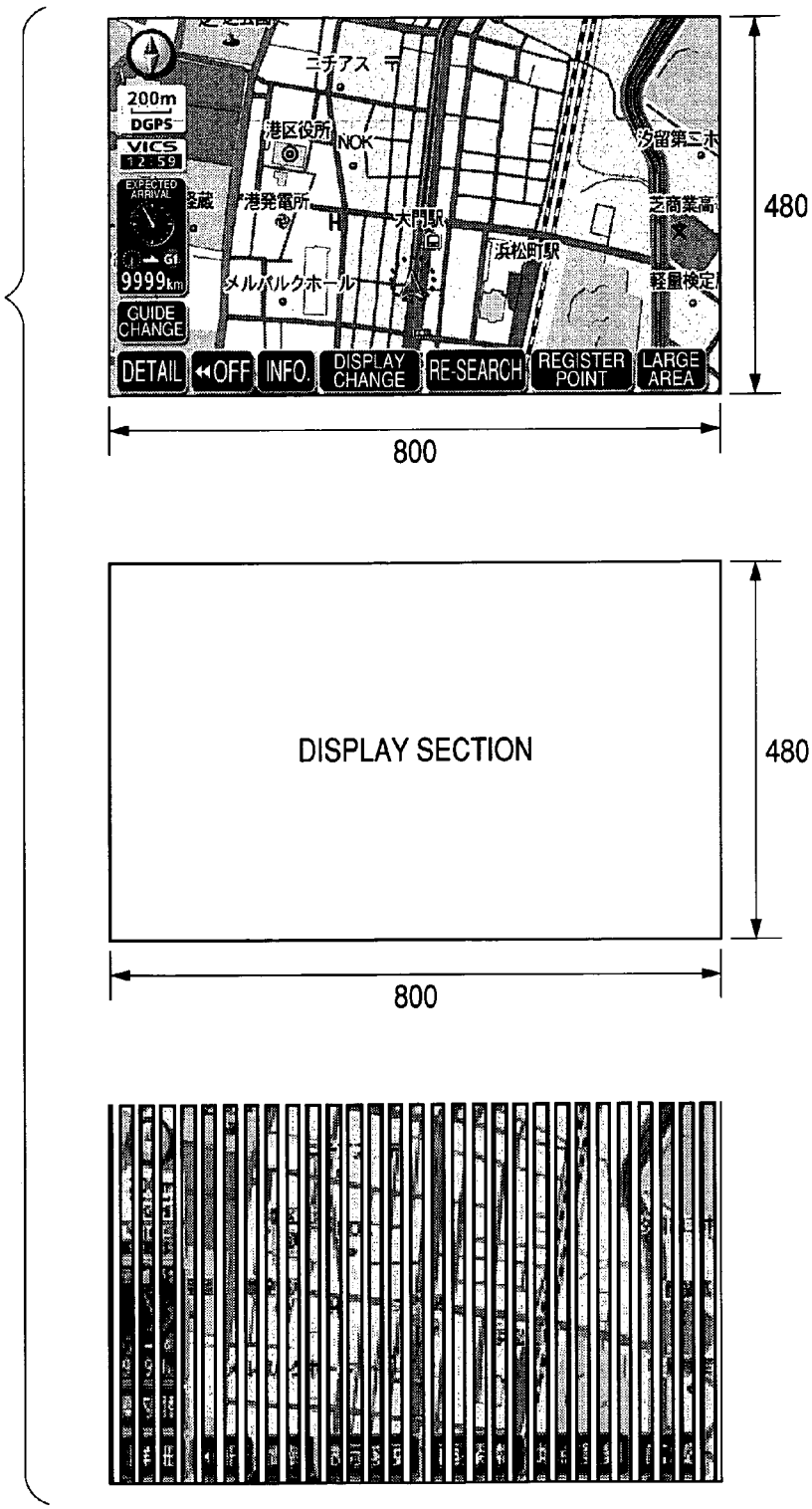
FIG. 20 is an explanatory diagram of a video signal.

On the other hand, as shown in FIG. 20, when an image source of 800×480 pixels (VGA) shown in the top of the figure is displayed on the display section 325 of the same size shown in the middle of the figure, the video source is compressed by ½ in the horizontal direction as shown in the bottom of the figure, to thereby lower resolution in the horizontal direction.

While it has been illustrated in the above-described embodiment that the display section 325 simultaneously displays different images in two directions of the driver's seat side and the passenger's seat side, the principle of the invention is applicable to a multi-view display section for simultaneously displaying different images in three or more directions.

It is assumed that the number of simultaneously displayable different video pictures, that is, the number of viewing directions, is n. If n/3 is not an integer, a display section may be configured so that a group of sub-pixels for displaying a video picture in each direction is arranged for each sub-pixel corresponding to n−1 in the horizontal direction (the first direction). In this case, since each group of sub-pixels is arranged to have R, G, and B sub-pixels, it is possible that the source signal output from the source signal converting section 350 or a video signal including a source interpolating signal can correspond the sub pixels. That is, it is possible to arrange and output the pixel data suo that pixel data for R are input to the R sub-pixels, pixel data for G are input to the G sub-pixels, and pixel data for B are input to the B sub-pixels.

As another example, it is assumed that the number of simultaneously displayable different video pictures, that is, the number of viewing directions, is n. If n/3 is an integer, a display section may be configured so that a group of sub-pixels for displaying a video picture in each direction is arranged for each sub-pixel corresponding to 3n/3 in the horizontal direction (the first direction). Even in this case, since each group of sub-pixels is arranged to have R, G, and B sub-pixels, it is possible that the source signal output from the source signal converting section 350 or a video signal including a source interpolating signal can correspond the sub pixels. That is, it is possible to arrange and output the pixel data such that pixel data for R are input to the R sub-pixels, pixel data for G are input to the G sub-pixels, and pixel data for B are input to the B sub-pixels.

At this time, it is preferable that pixels have horizontal resolution n times or more as large as that of each source signal in the horizontal direction (the first direction). In addition, it is preferable that pixels have vertical resolution n times or more as large as that of each source signal in the vertical direction as the second direction. In this case, it is preferable to output video signals in which source signals are arranged every n−1 rows and to output video signals including the interpolation source signal in the remaining rows using the known art.

Figures 19A, 19B:
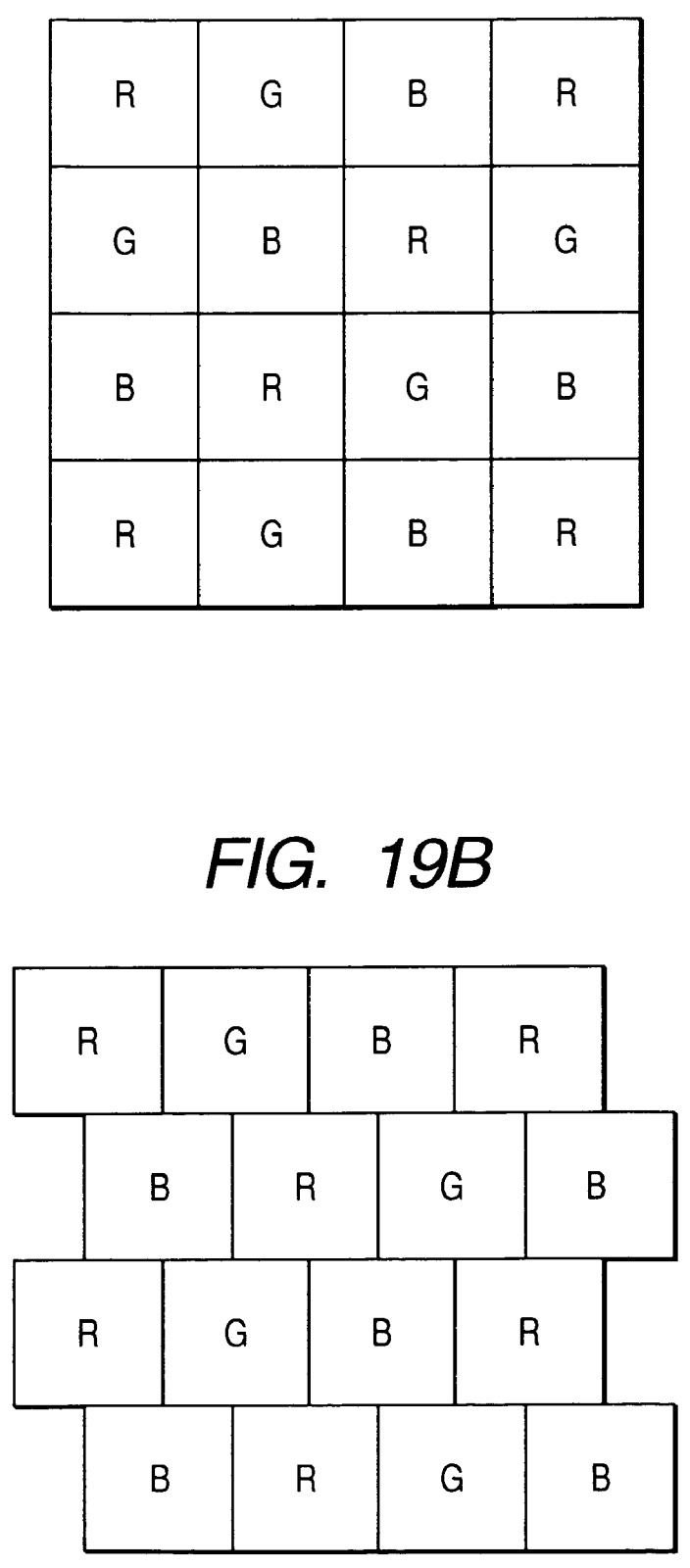

While the R, G, and B arrangement is the stripe arrangement in the above embodiment, it may be a diagonal arrangement as shown in FIG. 19A or a delta arrangement as shown in FIG. 19B. At this time, the interpolation signal may be generated using a source signal output to sub-pixels having the same color of proximate columns in a previous row or a next row.

While it has been illustrated in the above-described embodiment that the source signal has 400×234 pixels and the display section 325 has 800×234 pixels or 800×468 pixels, the resolution is not limited to this. In the invention, the horizontal resolution of the display section 325 may be at least higher than the horizontal resolution of the source signal.

In the above embodiment, the first direction is the horizontal direction and the second direction is the vertical direction. This assumes that a direction in which images are separated by the parallax barriers as the first direction. However, if the direction in which images are separated by the parallax barriers is the vertical direction, it may be assumed that the first direction is the vertical direction and the second direction is the horizontal direction.

While it has been illustrated in the above embodiment that the liquid crystal panel disclosed in US 2004/119896, which is incorporated herein by reference in its entirety, is used as the display device, the display device of the invention is not limited to this. The invention may employ structures disclosed in U.S. Pat. No. 6,954,185, which is also incorporated by reference in its entirety. The principle of the invention is similarly applicable to general multi-view display devices constructed using an organic EL or plasma display, CRT, SED or the like.

While a number of exemplary aspect and embodiments have been discussed above, those of skill in the art will recognize certain modifications, permutations, additions and sub-combinations thereof. It is therefore intended that the following appended claims and claims hereinafter introduced are interpreted to include all such modifications, permutations, additions and sub-combinations as are within the true spirit and scope.

What is claimed is:

1. A display device comprising:
a display operable to simultaneously display, on a single screen, a first video toward a first view angle based on a first source signal and a second video toward a second view angle based on a second source signal; and
a signal source operable to generate the first source signal and the second source signal;
wherein the screen includes a plurality of pixel lines arranged in a first direction, each of the pixel lines includes a plurality of pixels arranged in a second direction perpendicular to the first direction;
wherein the pixels in odd-numbered pixel lines are used for displaying the first video toward the first view angle and pixels in even-numbered pixel lines are used for displaying the second video toward the second view angle;
wherein the signal source generates the first source signal so that the number of pixels to be arranged in the first direction in the first source signal is equal to or less than the number of the odd-numbered pixel lines and generates the second source signal so that the number of pixels to be arranged in the first direction in the second source signal is equal to or less than the number of the even-numbered pixel lines; and
wherein the generated first and second source signals are supplied to the display without being subjected to a compression processing and pixels in the first source signal and pixels in the second source signal are distributed on pixels in the screen at an interval to cause the display to display the first video and the second video.

2. The display device according to claim 1, wherein the signal source generates the first source signal so that the number of pixels to be arranged in the first direction in the first source signal is equal to the number of the odd-numbered pixel lines and generates the second source signal so that the number of pixels to be arranged in the first direction in the second source signal is equal to the number of the even-numbered pixel lines.

3. The display device according to claim 1, wherein each of the pixels in the screen correspond to one of three primary color components and the pixels are positioned on the screen so that the three primary color components are arranged alternately in the first direction.

4. The display device according to claim 1,
wherein the signal source generates the first source signal so that the number of pixels to be arranged in the second direction in the first source signal is less than the number of the pixels arranged in the second direction in the screen and generates the second source signal so that the number of pixels to be arranged in the second direction in the second source signal is less than the number of the pixels arranged in the second direction in the screen; and
wherein the first and second source signals are used for driving pixels arranged in the second direction at an interval and a interpolation signal is used for driving the other pixels.

5. The display device according to claim 4, wherein the interpolation signal is generated based on the first and second source signals.

6. The display device according to claim 1, wherein the signal source generates the first source signal so that the number of pixels to be arranged in the second direction in the first source signal is equal to the number of pixels arranged in the second direction in the screen and generates the second source signal so that the number of pixels to be arranged in the second direction in the second source signal is equal to the number of pixels arranged in the second direction in the screen.

7. The display device according to claim 1, wherein the signal source includes at least one of a television device, a digital versatile disc player, a hard disc drive and a navigation device.

8. A display device comprising:
a display operable to simultaneously display, on a single screen, a first video toward a first view angle based on a first source signal and a second video toward a second view angle based on a second source signal; and
a signal source operable to generate the first source signal and the second source signal;
wherein the screen includes a plurality of pixel lines arranged in a first direction, each of the pixel lines includes a plurality of pixels arranged in a second direction perpendicular to the first direction;
wherein pixels in odd-numbered pixel lines are used for displaying the first video toward the first view angle and pixels in even-numbered pixel lines are used for displaying the second video toward the second view angle;

wherein when the signal source generates the first source signal so that the number of pixels to be arranged in the first direction in the first source signal is equal to or less than the number of the odd-numbered pixel lines and generates the second source signal so that the number of pixels to be arranged in the first direction in the second source signal is equal to or less than the number of the even-numbered pixel lines, the generated first and second source signal is supplied to the display without being subjected to a compression processing and pixels in the first source signal and pixels in the second source signal are distributed on pixels in the screen at an interval to cause the display to display the first video and the second video;

wherein when the signal source generates the first source signal so that the number of pixels to be arranged in the first direction in the first source signal is greater than the number of the odd-numbered pixel lines and generates the second source signal so that the number of pixels to be arranged in the first direction in the second source signal is greater than the number of the even-numbered pixel lines, the generated first and second source signals are subjected to the compression processing and supplied to the display.

9. The display device according to claim 8, wherein each of the pixels in the screen correspond to one of three primary color components and the pixels are positioned on the screen so that the three primary color components are arranged alternately in the first direction.

10. The display device according to claim 8,
wherein when the signal source generates the first source signal so that the number of pixels to be arranged in the second direction in the first source signal is less than the number of the pixels arranged in the second direction in the screen and generates the second source signal so that the number of pixels to be arranged in the second direction in the second source signal is less than the number of the pixels arranged in the second direction in the screen, the first and second source signals are used for driving pixels arranged in the second direction at an interval and a interpolation signal is used for driving the other pixels;

wherein when the signal source generates the first source signal so that the number of pixels to be arranged in the second direction in the first source signal is greater than the number of the pixels arranged in the second direction in the screen and generates the second source signal so that the number of pixels to be arranged in the second direction in the second source signal is greater than the number of the pixels arranged in the second direction in the screen, the first and second source signals are subjected to the compression processing and used for driving pixels arranged in the second direction at an interval and the interpolation signal is used for driving the other pixels.

11. The display device according to claim 10, wherein when the signal source generates the first source signal so that the number of pixels to be arranged in the first direction in the first source signal is less than the number of the pixels arranged in the first direction in the screen and generates the second source signal so that the number of pixels to be arranged in the first direction in the second source signal is less than the number of the pixels arranged in the first direction in the screen, the first and second source signals are used for driving pixels arranged in the first direction at an interval and the interpolation signal is used for driving the other pixels.

12. The display device according to claim 8
wherein when the signal source generates the first source signal so that the number of pixels to be arranged in the second direction in the first source signal is equal to or less than the number of the pixels arranged in the second direction in the screen and generates the second source signal so that the number of pixels to be arranged in the second direction in the second source signal is equal to or less than the number of pixels arranged in the second direction in the screen, the generated first and second source signal is supplied to the display without being subjected to a compression processing and pixels in the first source signal and pixels in the second source signal are distributed on pixels in the screen at an interval to cause the display to display the first video and the second video;

wherein when the signal source generates the first source signal so that the number of pixels to be arranged in the second direction in the first source signal is greater than the number of pixels arranged in the second direction in the screen and generates the second source signal so that the number of pixels to be arranged in the second direction in the second source signal is greater than the number of the pixels arranged in the second direction in the screen, the generated first and second source signals are subjected to the compression processing and supplied to the display.

13. A display method comprising:
simultaneously displaying, on a single screen, a first video toward a first view angle based on a first source signal and a second video toward a second view angle based on a second source signal; and generating the first source signal and the second source signal;

wherein the screen includes a plurality of pixels arranged in a first direction, each of the pixel lines includes a plurality of pixels arranged in a second direction perpendicular to the first direction;

wherein pixels in odd-numbered pixel lines are used for displaying the first video toward the first view angle and pixels in even-numbered pixel lines are used for displaying the second video toward the second view angle;

wherein the first source signal is generated so that the number of pixels to be arranged in the first direction in the first source signal is equal to or less than the number of the odd-numbered pixel lines and the second source signal is generated so that the number of pixels to be arranged in the first direction in the second source signal is equal to or less than the number of the even-numbered pixel lines; and wherein the generated first and second source signals are supplied to the screen without being subjected to a compression processing and pixels in the first source signal and pixels in the second source signal are distributed on pixels in the screen at an interval to cause the screen to display the first video and the second video.

14. The display method according to claim 13, wherein each of the pixels in the screen correspond to one of the three primary color components and the pixels are positioned on the screen so that the three primary color components are arranged alternately in the first direction.

15. The display method according to claim 13, wherein the first source signal is generated so that the number of pixels to be arranged in the second direction in the first source signal is less than the number of the pixels arranged in the second direction in the screen and the second source signal is generated so that the number of pixels to be arranged in the second direction in the second source signal is less than the number of the pixels arranged in the second direction in the screen; and wherein the first and second signals are used for driving pixels arranged in the second direction at an interval and a interpolation signal is used for driving the other pixels.

16. The display method according to claim 15, wherein the interpolation signal is generated based on the first and second source signals.

17. A display method comprising:

simultaneously displaying, on a single screen, a first video toward a first view angle based on a first source signal and a second video toward a second view angle based on a second source signal; and generating the first source signal and the second source signal;

wherein the screen includes a plurality of pixel lines arranged in a first direction, each of the pixel lines includes a plurality of pixels arranged in a second direction perpendicular to the first direction;

wherein pixels in odd-numbered pixel lines are used for displaying the first video toward the first view angle and pixels in even-numbered pixel lines are used for displaying the second video toward the second view angle;

wherein when the first source signal is generated so that the number of pixels to be arranged in the first direction in the first source signal is equal to or less than the number of the odd-numbered pixel lines and the second source signal is generated so that the number of pixels to be arranged in the first direction in the second source signal is equal to or less than the number of the even-numbered pixel lines, the generated first and second source signal is supplied to the screen without being subjected to a compression processing and pixels in the first source signal and pixels in the second source signal are distributed on pixels in the screen at an interval to cause the screen to display the first video and the second video;

wherein when the first source signal is generated so that the number of pixels to be arranged in the first direction in the first source signal is greater than the number of the odd-numbered pixel lines and the second source signal is generated so that the number of pixels to be arranged in the first direction in the second source signal is greater than the number of the even-numbered pixel lines, the generated first and second source signals are subjected to the compression processing and supplied to the display.

* * * * *